(12) United States Patent
Phlipot

(10) Patent No.: US 6,184,649 B1
(45) Date of Patent: Feb. 6, 2001

(54) POWER CONVERTER WITH DESULFATION MODE

(75) Inventor: Thomas H. Phlipot, Jackson, MI (US)

(73) Assignee: Progressive Dynamics, Inc., Marshall, MI (US)

(*) Notice: Under 35 U.S.C. 154(b), the term of this patent shall be extended for 0 days.

(21) Appl. No.: 09/349,391

(22) Filed: Jul. 9, 1999

Related U.S. Application Data

(63) Continuation-in-part of application No. 08/729,053, filed on Oct. 10, 1996, now Pat. No. 5,982,643.

(51) Int. Cl.[7] ......................................................... H02J 7/00
(52) U.S. Cl. .................................................. 320/100; 363/25
(58) Field of Search ................................... 320/100, 153, 320/159; 363/21, 25; 429/96–100

(56) References Cited

U.S. PATENT DOCUMENTS

| | | | |
|---|---|---|---|
| 4,061,956 | * 12/1977 | Brown et al. | 320/153 |
| 5,349,668 | * 9/1994 | Gladstein et al. | 364/273.1 |
| 5,396,163 | * 3/1995 | Nor et al. | 320/159 |

OTHER PUBLICATIONS

Ample Power Company, Smart Charger Installation and Operating Manual, Dec. 8, 1992, pp. 1–16 (includes 3 sheets of drawings).

* cited by examiner

*Primary Examiner*—Peter S. Wong
*Assistant Examiner*—Lawrence Luk
(74) *Attorney, Agent, or Firm*—Price, Heneveld, Cooper, DeWitt & Litton

(57) ABSTRACT

A power converter supplies a charging current to a rechargeable battery responsive to a control module. The control module includes a microcontroller, a memory coupled to the microcontroller and power converter code. The power converter code causes the microcontroller to determine a battery output voltage of the rechargeable battery. The power converter code also causes the microcontroller to provide a control signal, which adjusts the power converter output voltage responsive to the battery output voltage. The control module also provides for a desulfation mode when the power converter is in a storage mode.

16 Claims, 34 Drawing Sheets

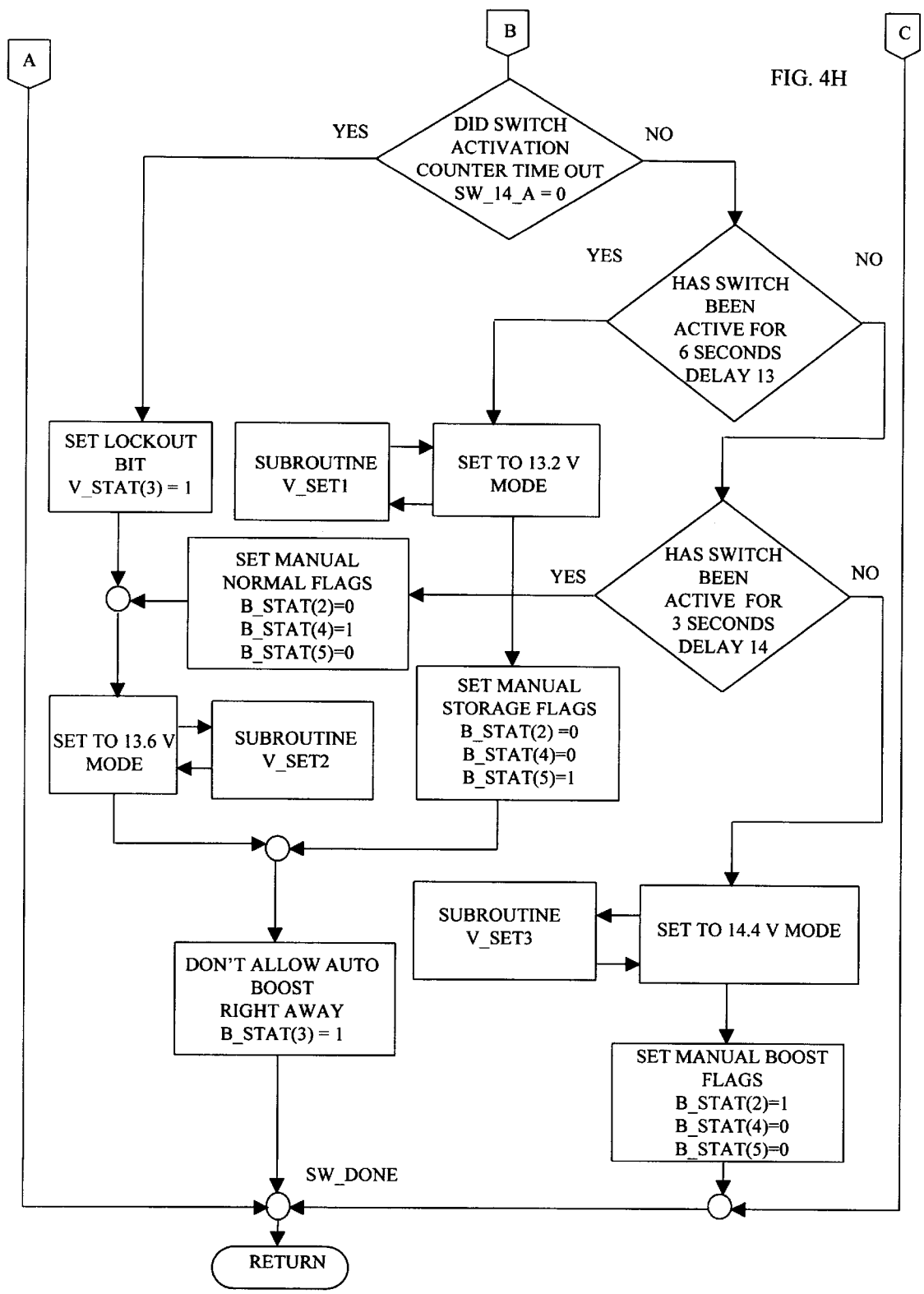

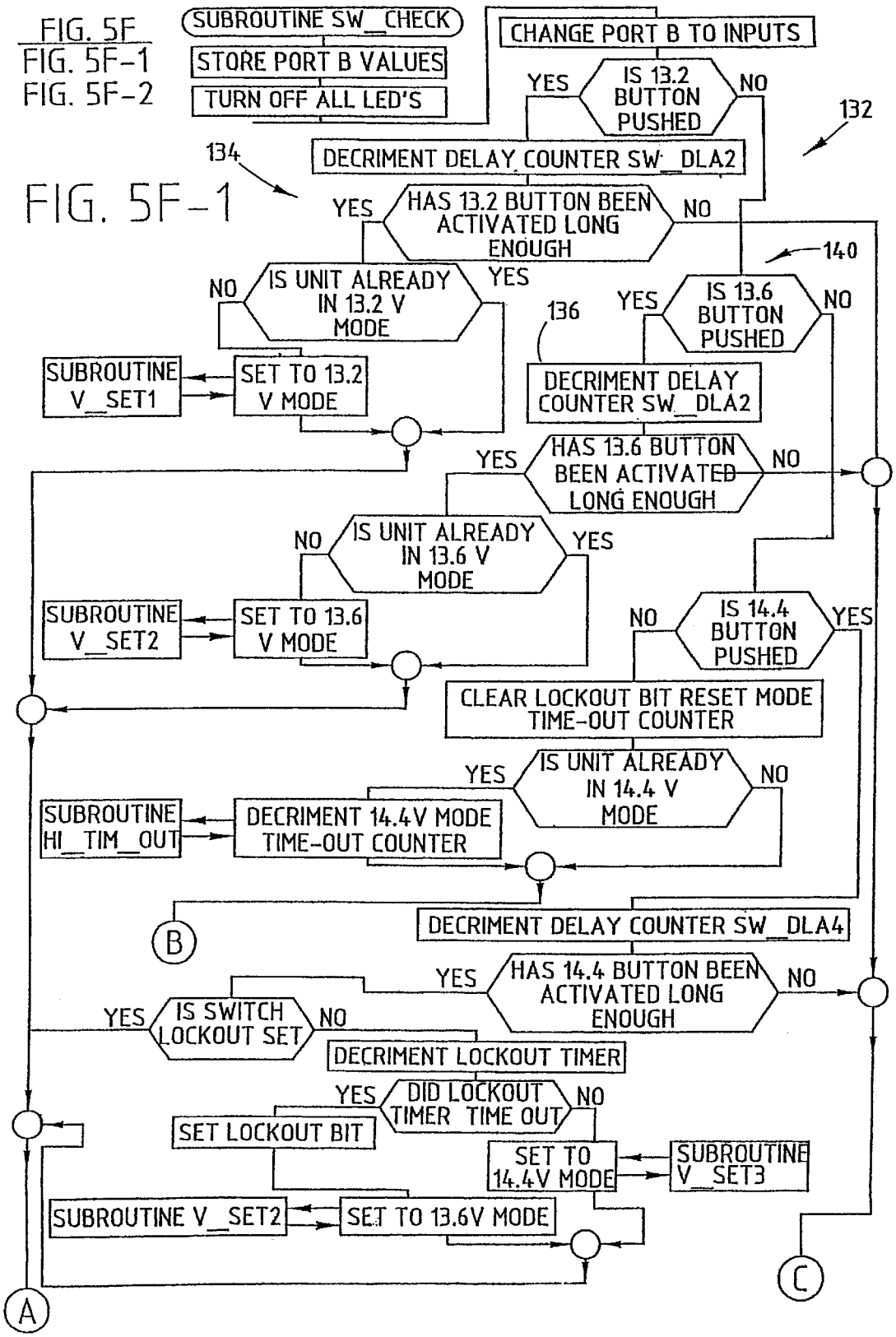

POWER CONVERTER WITH DESULFATION MODE

This application is a continuation-in-part of U.S. patent application Ser. No. 08/729,053, entitled "POWER CONVERTER WITH SELECTIVELY VARIABLE OUTPUT AND CONTROLLER AND DISPLAY SYSTEM THEREFOR," by Thomas H. Phlipot, filed Oct. 10, 1996, now U.S. Pat. No. 5,982,643, which is hereby incorporated by reference.

BACKGROUND OF THE INVENTION

The present invention generally relates to power converters, and more particularly to power converters that are utilized to charge lead-acid batteries, still more particularly to a control module that selectively and/or adaptively changes the magnitude of the power converter's output voltage such that sulfation of a lead-acid battery is avoided and/or reduced.

Power converters for converting AC power to a regulated DC level are well-known and frequently utilized to charge lead-acid batteries. Low-cost power converters typically comprise a rectifier and DC voltage regulator. These power converters typically fix the power converter's output voltage at some pre-determined level based on an optimum or standard operating and/or storage condition. The output voltage of these power converters is typically subject to substantial variation and instability, which leads to overcharge and/or undercharge of attached lead-acid batteries. Undercharging and/or overcharging a lead-acid battery normally shortens its operating life and causes reduced performance.

Increasing a power converter's output voltage aids in preventing electrolyte stratification and can reduce sulfation, thus extending both the life and capacity of the battery. On the other hand, decreasing the power converter's output voltage can reduce water boil-off which typically reduces maintenance and extends the battery's operating life.

Typical lead-acid batteries include lead/lead dioxide plates submerged in sulfuric acid. These plates are formed into cells which normally produce around 2 volts. A typical 12 volt battery includes six 2 volt cells. As a battery discharges, a chemical reaction transforms lead dioxide to lead sulfate. Lead sulfate acts as an insulator and decreases current flow through the battery. Additionally, the build-up of lead sulfate on a battery's plates causes a drop in the battery's output voltage. When a lead-acid battery is not in use it slowly self-discharges. This self-discharge also leads to sulfate build-up on the battery's plates. When the lead-acid battery is recharged the lead sulfate is normally converted back to lead dioxide. However, when a battery is left in a discharged state for an extended period, the lead sulfate hardens and the battery becomes more difficult to charge. This, in turn, leads to increased lead sulfate build-up until the battery becomes useless.

SUMMARY OF THE PRESENT INVENTION

An embodiment of the present invention is directed to a control module for controlling a power converter output voltage. The power converter output voltage supplies a charging current to a rechargeable battery responsive to the control module. The control module includes a microcontroller, a memory coupled to the microcontroller and power converter code. The power converter code causes the microcontroller to determine a battery output voltage of the rechargeable battery. The power converter code also causes the microcontroller to provide a control signal to the power converter. The control signal adjusts the power converter output voltage responsive to the battery output voltage. An advantage of the present invention is that it provides for desulfation of a rechargeable battery when it is not being utilized, i.e, when the power converter is in a storage mode.

BRIEF DESCRIPTION OF THE DRAWINGS

FIGS. 4G–H are flow diagrams of the SW_CHECK subroutine contained in the main program of FIGS. 4A–D, used to check the status of the manual Boost switch;

FIGS. 4N–O are flow diagrams of the BOOST subroutine contained in the main program of FIGS. 4A–D and FIG. 5A, used to control the automatic Boost function and various time-out features of the Boost Mode;

DETAILED DESCRIPTION OF THE PREFERRED EMBODIMENT

Figures 1, 2:
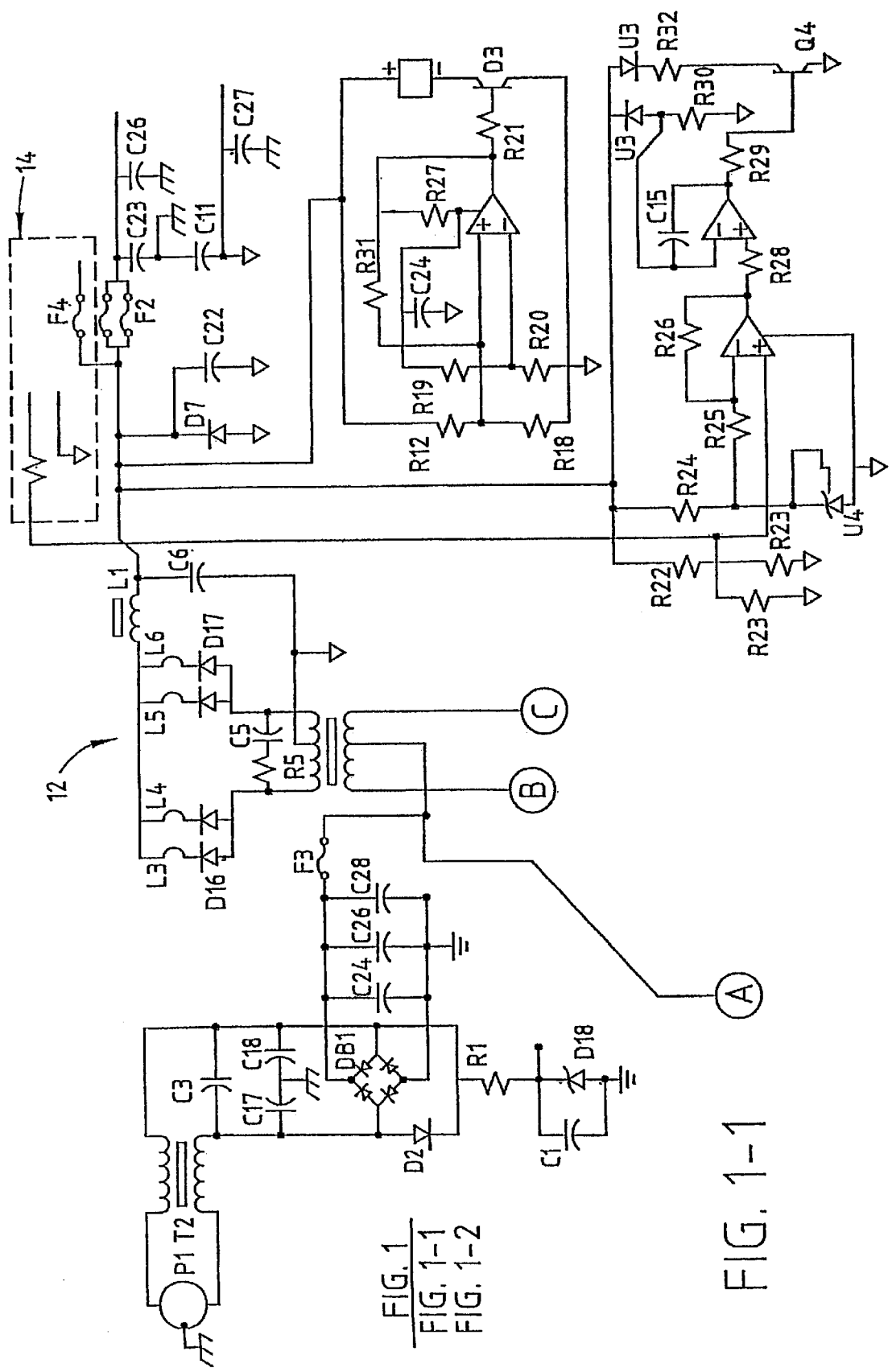
FIG. 1 is a schematic diagram of a preferred power converter circuit, showing the external circuitry of the remote controller interface.
FIG. 2 is a schematic diagram of a preferred control module which includes a microcontroller, according to an embodiment of the invention.
Figures 1, 2:
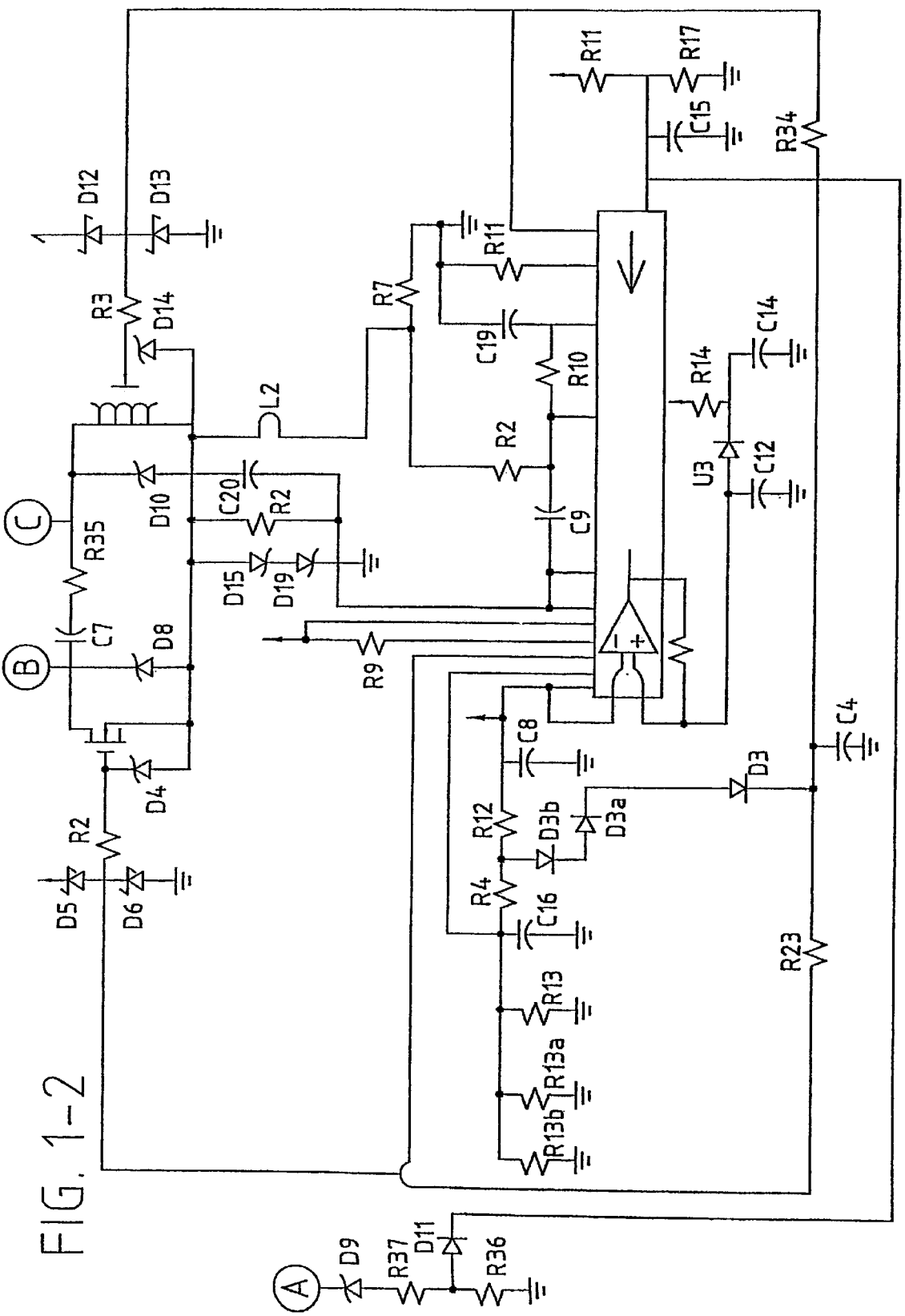
Figure 2:
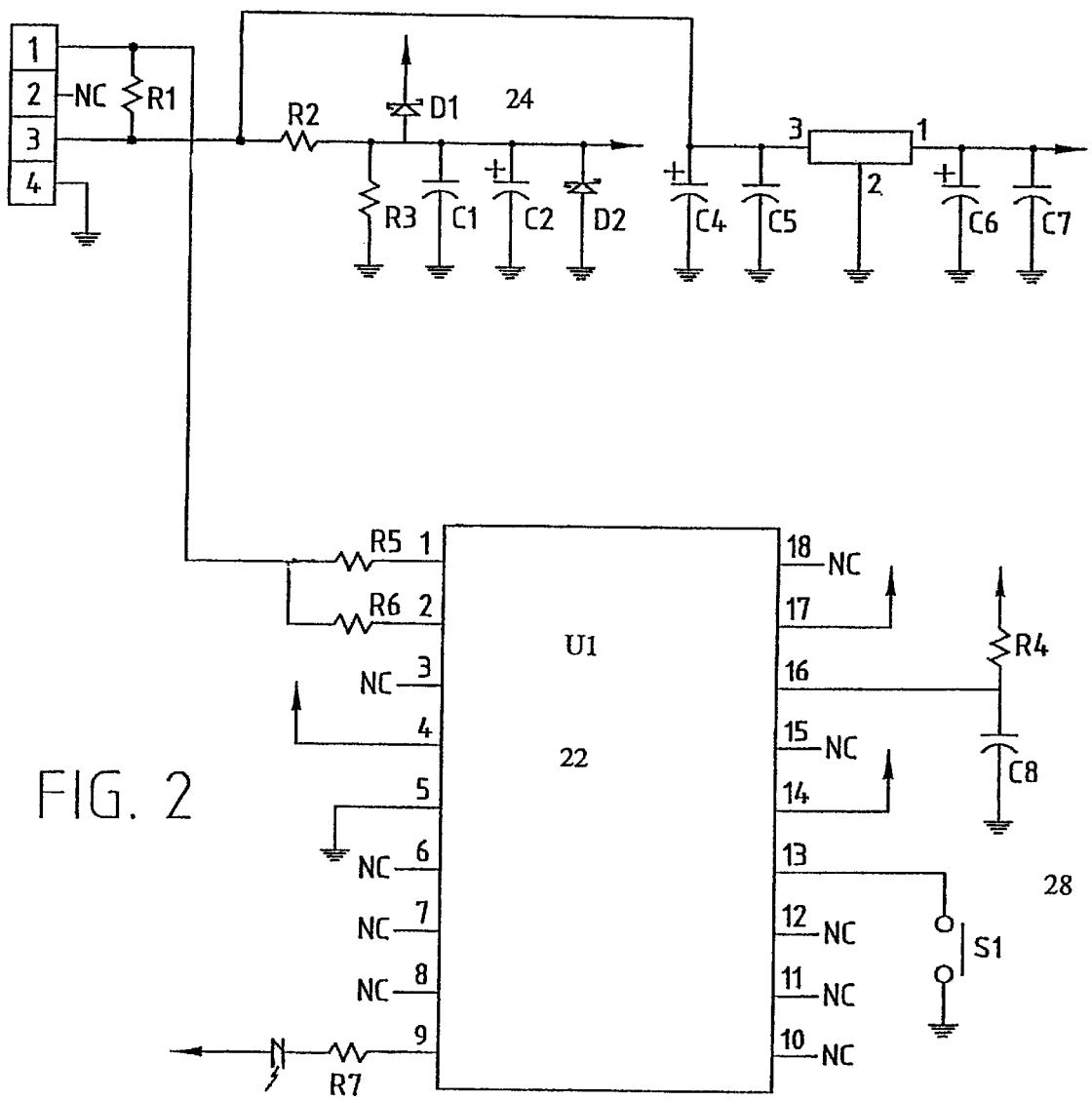

It will become apparent to those skilled in the art that various modifications to the preferred embodiments of the invention as described herein can be made without departing from the spirit or scope of the invention.

The present invention overcomes the disadvantages of the prior art power supplies and power converters noted above by providing a system to increase or decrease output voltage in response to a specific load, e.g., battery condition, or operator demand. The system of the invention includes an interface, which imposes a selectable command signal or communicates a control signal (derived from a battery output voltage) to the power converter. In response to the control signal a power converter output voltage is raised or lowered.

According to one aspect of the invention, a control module is coupled to the interface (and to a load, in particular a vehicle battery) and operates to automatically change the power converter output voltage up or down in response to the load. The control module uses a microcontroller to sense an outside stimulus such as the battery output voltage. The microcontroller contains an analog-to-digital converter which processes input voltages (such as the battery output voltage). When power is applied to the control module, the system initializes and the power converter begins to charge in Normal Mode; i.e., the power converter charges at the standard 13.6 volt level. If the battery output voltage changes, the microcontroller detects the change, processes it and outputs an appropriate control signal which is transmitted via the interface to the power converter.

According to another aspect of the invention, when the power converter has been in the Storage Mode (storage voltage of 13.2 V) for approximately 21 hours, the control module causes the power converter to go to the Boost Mode (boost voltage of 14.4 V) for approximately 15 minutes. This effectively provides a Desulfation Mode (or Rejuvenation Mode) wherein sulfates that have built-up on the battery plates are normally reduced. Proper and timely charging, in this manner, dissolves the sulfates and keeps them from hardening into insulators. After the 15 minute period expires, the control module causes the power converter to return to the Storage Mode. One skilled in the art will appreciate that the optimum period for desulfation may vary with application.

According to further aspects of the invention, when the interface to the power converter receives a signal from the control module to enter Boost Mode, the power converter output voltage is forced to 14.4 volts until the battery is charged to a predetermined level, e.g., approximately 14.0 volts, or for a specific time, or both. This mode may be entered in one of four ways. First, it can be triggered by manually activating a "Boost" switch. Alternatively, the Boost Mode will be triggered automatically by a series of subroutines stored in the memory of the microcontroller if the battery output voltage drops below a predetermined level, or if the control module is coming out of the Storage Mode (described below) or when the control module has been in the Storage Mode for a certain period (described above).

Whenever the Boost Mode is so activated, the power converter will return to Normal Mode (except when entered as a Desulfation Mode) after a maximum predetermined period (e.g., eight hours in automatic Boost ("Auto Boost") or four hours in manual Boost) or at any time the power converter output voltage (system voltage) exceeds 14.0 volts for four hours. In addition, if the Boost switch becomes shorted or is pressed for an extended period of time, the control module ignores the switch and signals the power converter to resume Normal Mode operation while all other Auto Boost features remain functional.

According to another aspect of the invention, the control module can place the power converter in a "Trickle" mode, in which the control module forces the power converter output to a lower voltage, e.g., 13.2 volts. In a preferred embodiment, the Trickle Mode is automatically activated during the Storage Mode which the control module activates at any time the system voltage remains relatively constant for four consecutive periods of 6 hours each. When in the Storage Mode, the power converter will be set to charge at 13.2 volts, the same output level triggered in Trickle Mode. If the battery output voltage decreases within a 15-minute interval, the control module causes the power converter to exit the Storage Mode and change to the Boost Mode. This operation "wakes-up" the battery before resuming normal operation.

According to a further aspect of the invention, an alternate embodiment of the control module includes manual control switches for each mode of operation: Storage (Trickle), Normal and Boost Modes. Alternatively, a single switch can be utilized to select the Boost, Normal or Storage mode. In this embodiment, when the single switch is activated, the control module cycles from mode to mode for a period, i.e., every three seconds. When the desired mode is reached, the switch is released which causes the control module to be held in that mode. The selection by switch can be overridden by software.

In addition, the control (main) program stored in the memory of the microcontroller includes subroutines to control further aspects of the invention. For instance, the subroutine, which checks the Boost Mode switch in the first embodiment preferably, includes instructions to check the switches for all modes of operation. Also, the control program preferably incorporates subroutines to control an LED display and aid in diagnosing abnormal conditions. The LED display of the control module indicates which mode the control module is in by varying the flash rate of the LED.

According to a further aspect of the invention, the control module is physically distinct from the power converter. The control module may be located either close to (e.g., directly at) the power converter, or at a different location, for example, one which affords easy access to the user. A "plug-in" type device is preferably utilized to connect the control module to the power converter. Therefore, the cost of the modular control capability is kept low while its flexibility of usage is increased. If the vehicle manufacturer wishes to provide the feature in one or more of its possible configurations, he may do so as an option, or if the end customer wants to upgrade by adding the apparatus or changing its configuration, this can very easily be done at any time.

In a relatively simple but very useful and effective example, such a "plug-in" device may simply comprise a plug-like member which incorporates resistive and/or other such voltage level-modifying circuitry. Components of the plug-like member provide an internal bias or other control voltage that is applied to the power converter to cause its output to be at some particular selected voltage level, e.g., one required to operate a particular accessory or other user device. Such a plug may simply be inserted into a socket provided on the power converter itself (or at some other convenient location), to cause the power converter output voltage to immediately change to the desired level. Many different such "plugs" could be provided for selective interchange to obtain a different power converter output voltage.

According to a still further aspect of the invention, the control module may provide a control input to the power converter based partially or totally upon other monitored parameters. For example, the control input can be based on the amount of current being drawn from the primary AC line supplying a recreational vehicle (see FIG. 3A) or other such user facility employing the power converter. In this manner, the power converter output voltage may be controlled in response to or as a function of the magnitude of such current draw, e.g., by changing the power converter output voltage in a predetermined and corresponding manner or by turning the power converter off during periods of AC line current draw exceeding an assigned threshold. This provides for better management of overall power consumption and decreases the likelihood of inadvertent component stress and resultant failure, while also increasing overall safety, etc.

These and other aspects, features and advantages of the present invention will be better understood after reading the following detailed description of preferred embodiments, together with reference to the accompanying drawings, in which the invention is disclosed in conjunction with a preferred form of power converter (more particularly identified hereinafter) with which it is particularly well adapted for operation.

Referring now to the drawings, and to FIG. 1 in particular, circuitry for an external power converter output control interface ("TCMS™ Interface") 14 is shown connected into the circuitry of a preferred type of power switching converter 12 to be used in a recreational vehicle or the like (not shown) for providing DC power to operate various accessories and appliances, and to charge batteries. Converter 12 is preferably of the type disclosed in commonly assigned U.S. Pat. No. 5,008,598, the complete disclosure of which is expressly incorporated herein by reference. The interface 14 operates to vary the output voltage of the power converter in response to a signal from a control module shown generally in FIG. 2, as discussed further below.

Referring now to FIG. 2, the control module 10 includes a module connector 20 which has an input at node (3) connected to a battery output voltage and an output at node (1) to deliver a control signal to the power converter 12 via the interface 14 shown in FIG. 1. The input voltage at node (3) is connected to the battery output voltage through a first analog circuit 24. The output, node (1), of the module connector 20 is connected to the microcontroller (U1) 22 of the control module 10. Specifically, the output of the connector 20 is connected to pins 1 and 2 of the microcontroller 22. In the preferred embodiment, the microcontroller 22 is a integrated circuit (Part No. PIC 16C710) manufactured by Microchip Technology Inc. of Chandler, Ariz. When pins 1 and 2 are active, they signal the system to 13.6 volts (Normal Mode) and 14.4 volts (Boost Mode), respectively. Otherwise, system voltage remains at 13.2 volts (Storage Mode). The microcontroller 22 will output these signals either manually when the user activates the switch 28 or automatically by operation of the software stored in the memory of the microcontroller.

Still referring to FIG. 2, the battery output voltage, which also supplies power to the microcontroller 22, is applied to the input of the first analog circuit 24. However, before it is so applied, the battery output voltage is divided by three by means of a voltage divider comprising resistors R2 and R3. This is necessary because the maximum allowable voltage on the analog input is five volts. Theoretically, the battery output voltage could be higher than 14.4 volts and, therefore, to protect the analog circuit, two zener diodes are included, D1 and D2 (preferably type IN5817). The first zener diode D1, is positioned between the input voltage (Vbatt/3) and 5 volts. The second zener diode D2, is positioned between the input voltage (Vbatt/3) and ground. Therefore, the input voltage from the battery to the module connector 20 of the control module 10 will never go below ground or above 5 volts. Finally, even if it did, the divider preferably includes protection circuitry to prevent destruction of the control module 10.

The general operation of the control module 10 is as follows. When the control module connector 20 is plugged into the power converter 12, the load resistor R1 (typically 750 K) connected between node (1) and node (3) operates to signal the power converter to decrease its output voltage from 13.6 V to 13.2 V (Storage Mode). Thereafter, if pin 1 of the microcontroller 20 is pulled below a certain level in response to the input voltage (battery output voltage), the microcontroller signals the power converter to begin outputting a stepped-up voltage equal to 13.6 V (Normal Mode). On the other hand, if pin 2 is pulled below a certain level the microcontroller signals the power converter to output 14.4 V, i.e., the microcontroller will activate the Boost Mode (described in detail below). Now, more specifically, when the TCMS (Total Charge Management System) module connector 20 is plugged into the power converter the power converter output voltage changes from 13.6 V to 13.2 V.

Figure 4A:
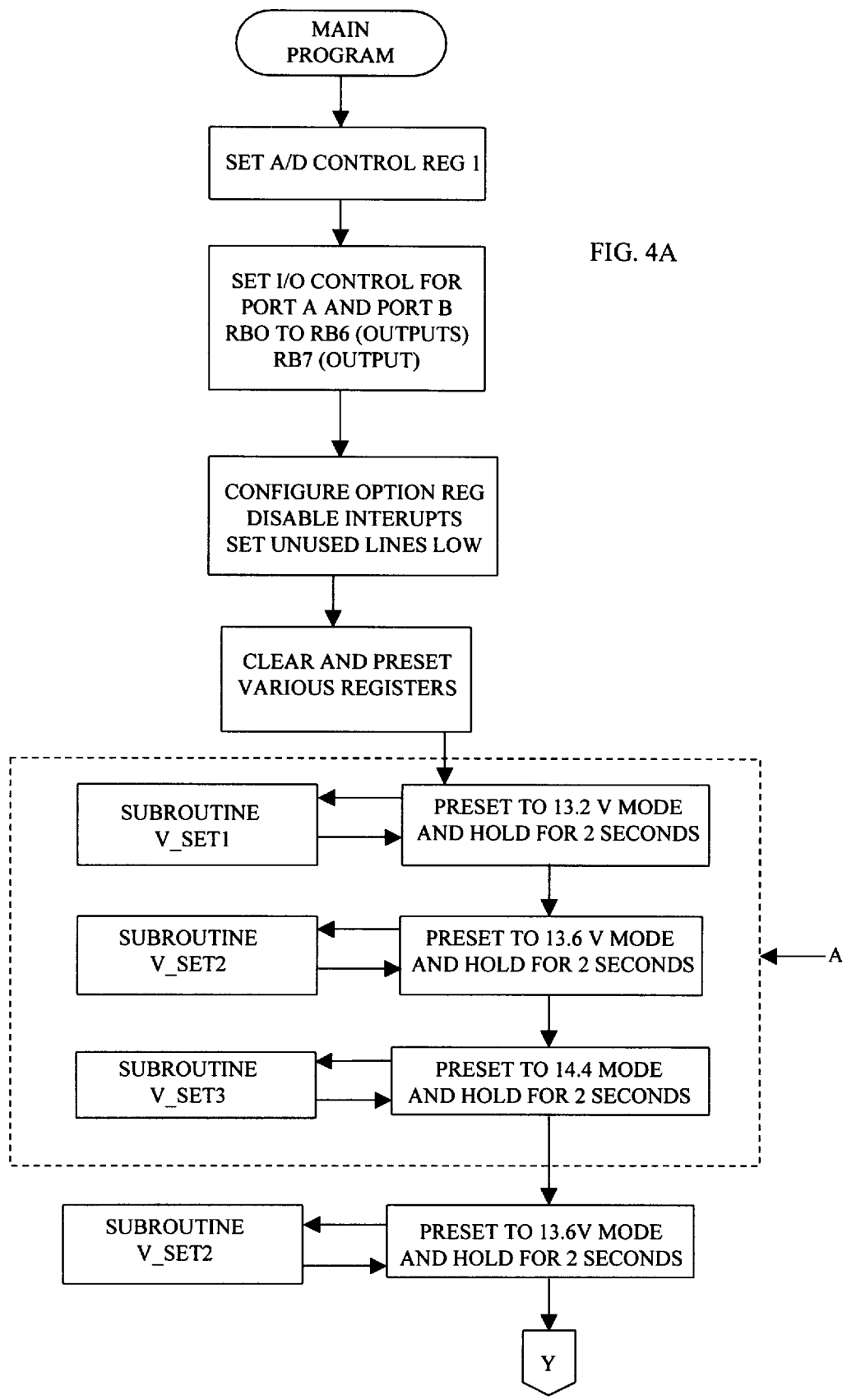
FIGS. 4A–D are flow diagrams of the main program stored in the memory of the microcontroller in accordance with a preferred embodiment as illustrated in FIG. 2.
Figure 4B:
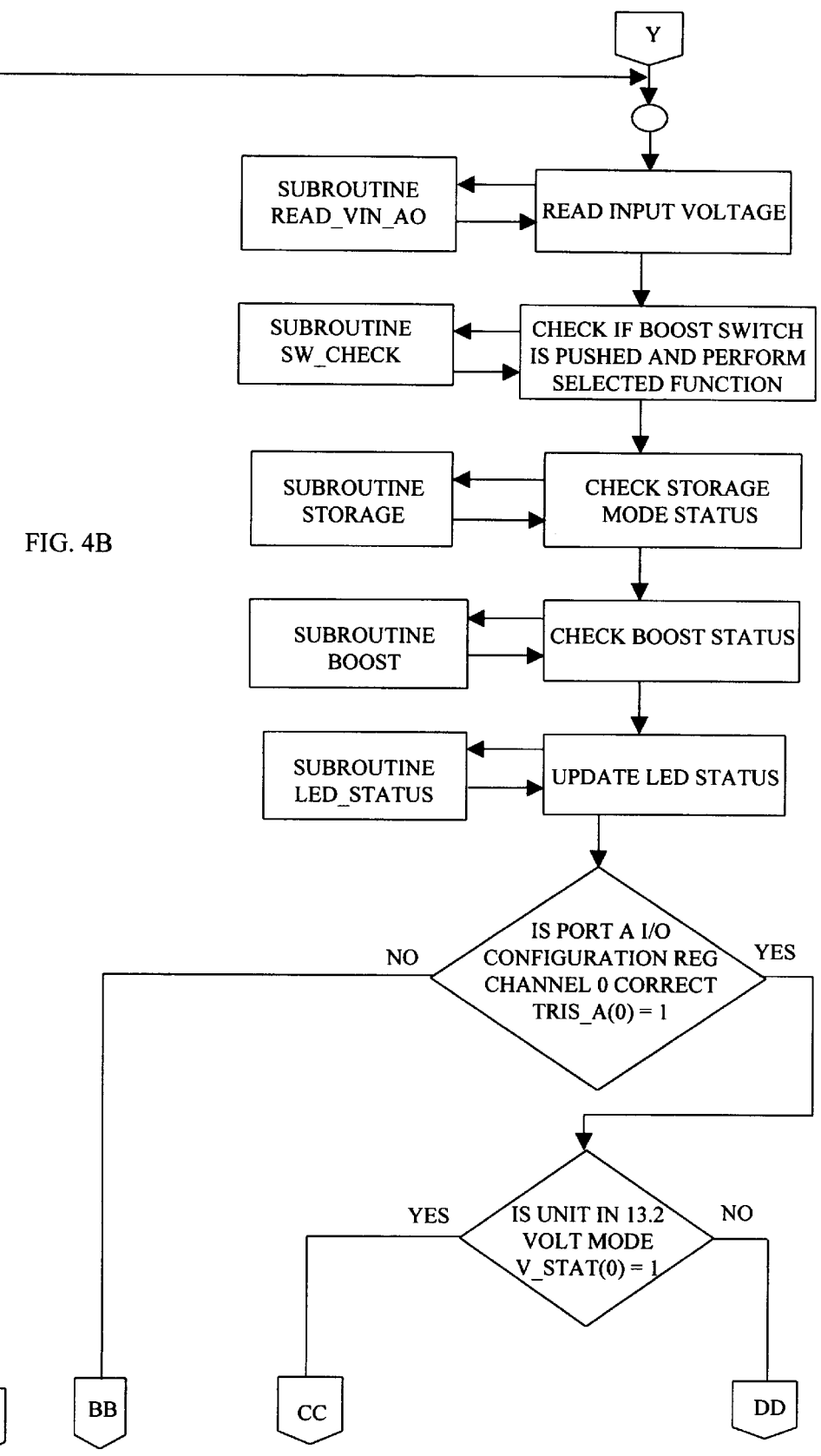
Figure 4C:
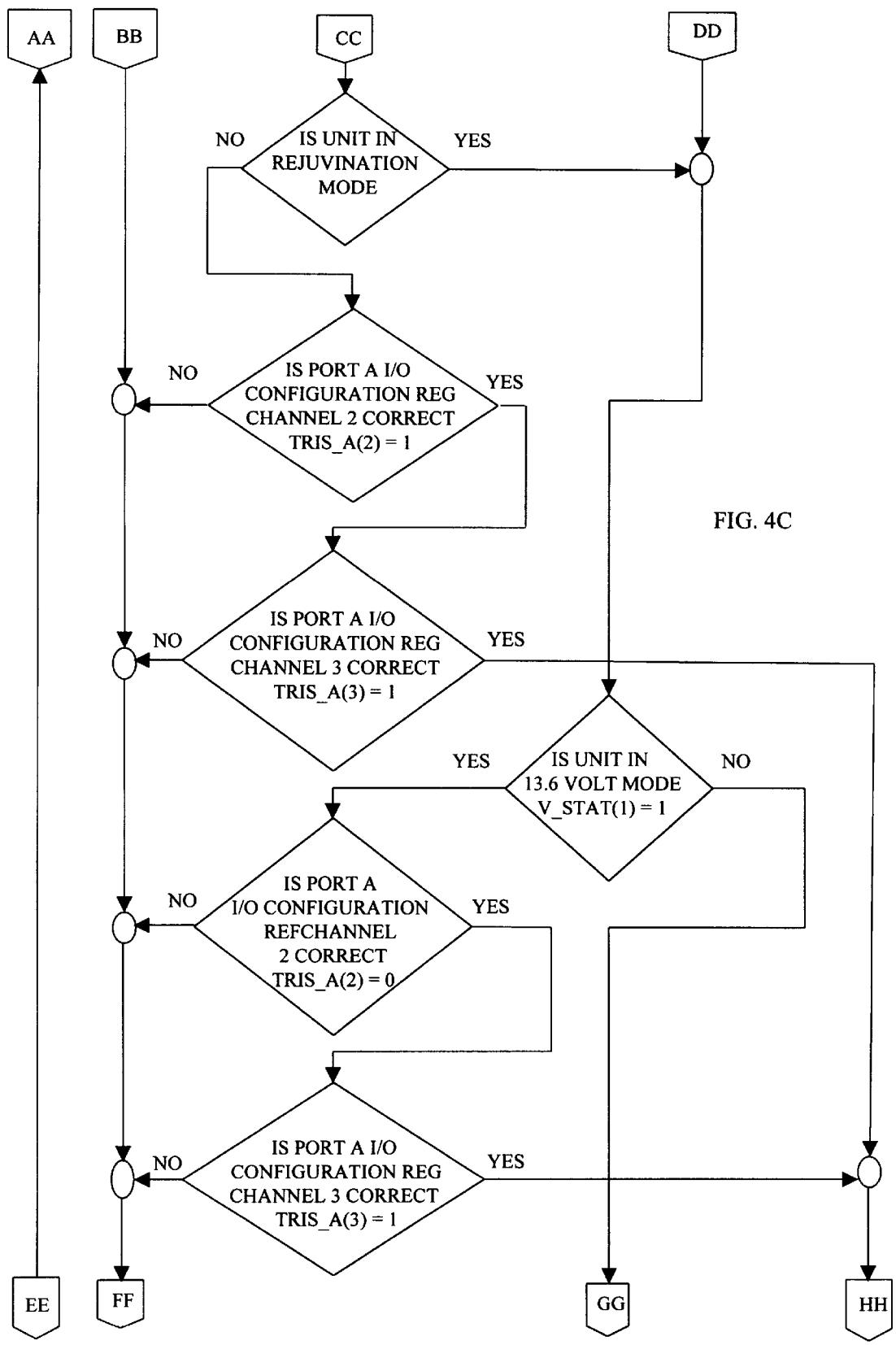
Figure 4D:
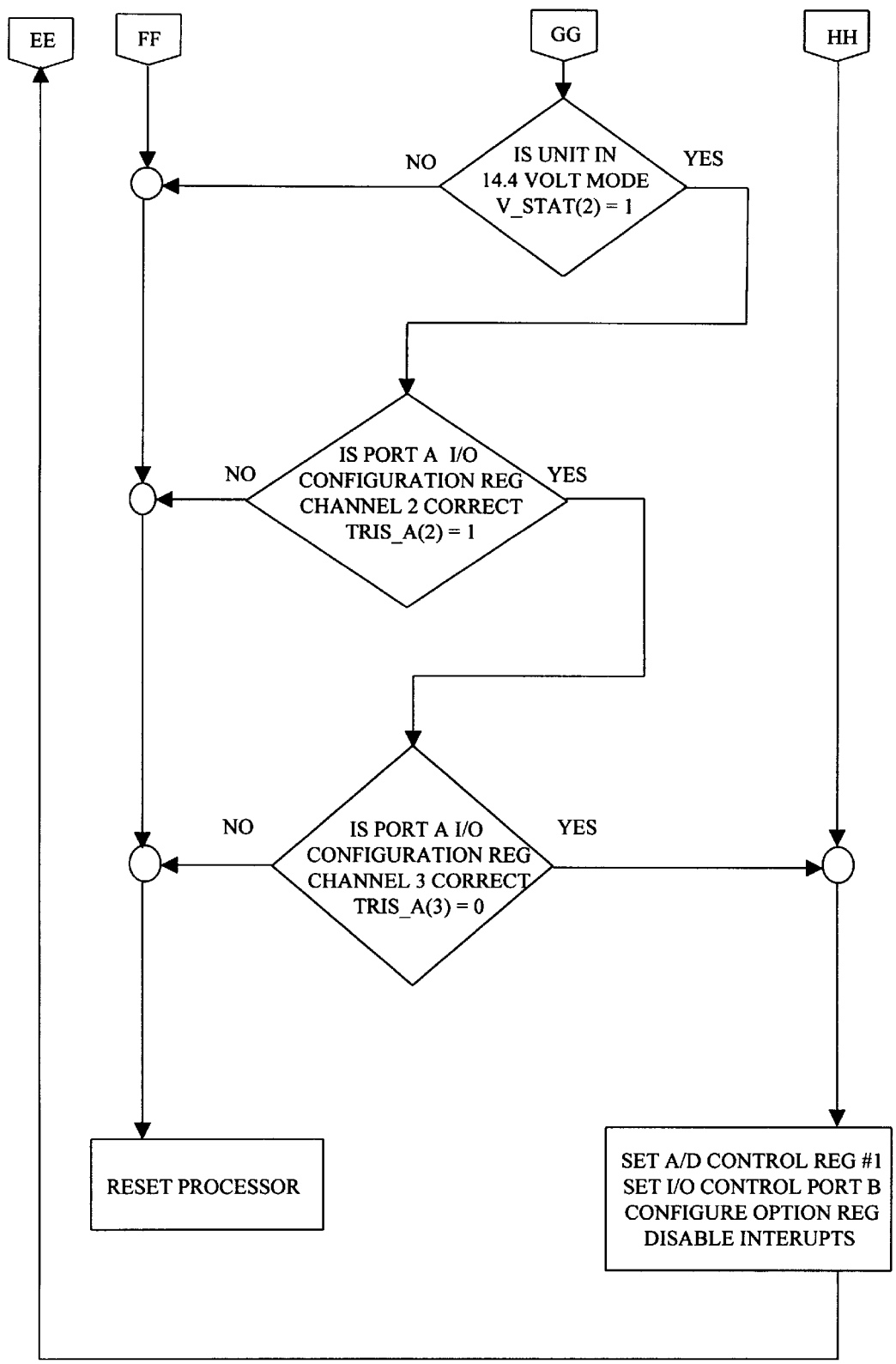
Figure 4E:
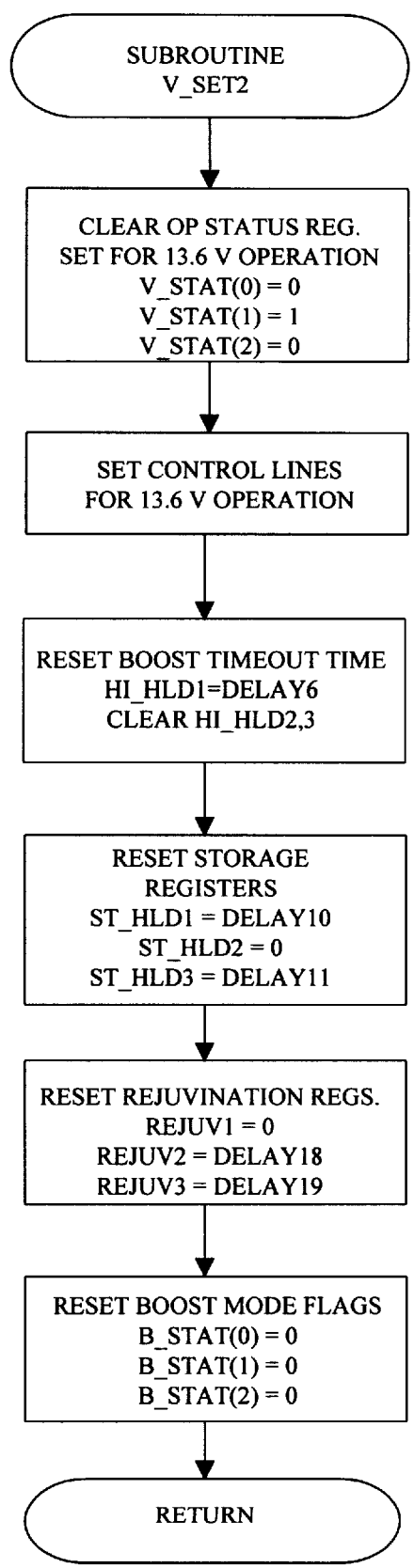
FIG. 4E is a flow diagram of the V_SET2 subroutine contained in the main program of FIGS. 4A–D and FIG. 5A, used to carry out Normal Mode configuration.

Referring generally to FIG. 2, and specifically to the diagram of main program in FIGS. 4A–D, the microcontroller 22 of the control module is initialized by configuring its registers. Thereafter, the analog-to-digital control register and the input/output control for port A and port B (output pins RB0–RB6 and RB7) are set. Then, the option register is configured, the interrupts are disabled and unused lines are set low. Each of the three modes previously noted (within the dashed-line rectangle, labeled "A") are cycled through to aid in manufacturing test items. Thereafter, the V_SET2 subroutine is called (FIG. 4E). This subroutine clears the operation status registers and then sets microcontroller 22 to output a signal for Normal Mode operation (V_STAT(0)=0, V_STAT(1)=1 and V_STAT(2)=0). Thereafter, the subroutine sets the control lines for Normal Mode operation and then returns to the main program. When the normal control signal is received, the power converter output voltage goes to 13.6 V.

Figure 4F:
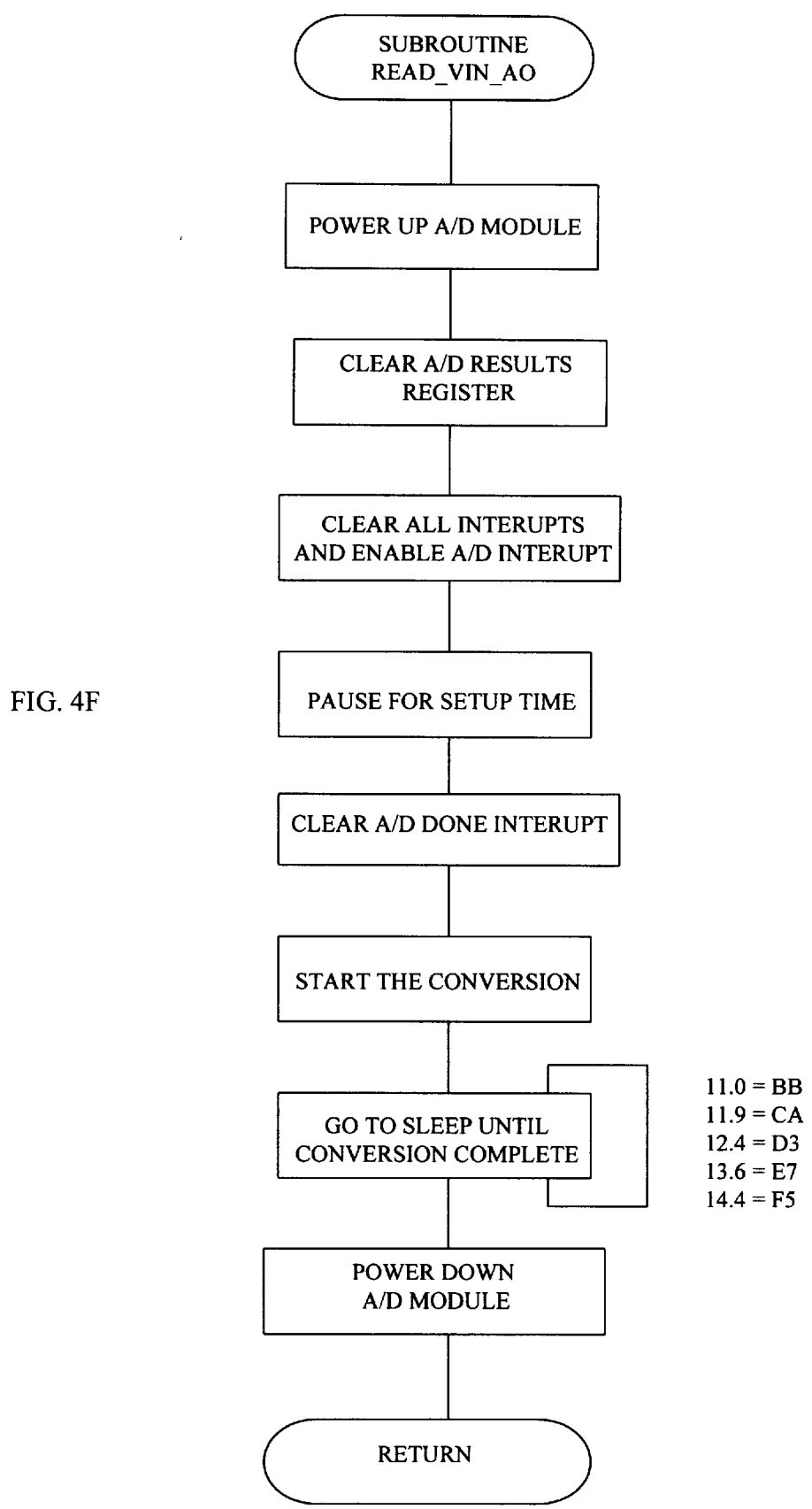
FIG. 4F is a flow diagram of the READ_VIN_AO subroutine contained in the main program of FIGS. 4A–D and FIG. 5A, used to read the input voltage.

The microcontroller 22 then reads the battery output voltage (VIN) at pin (17) by invoking a READ_VIN_AO subroutine (FIG. 4F). As previously mentioned, the microcontroller 22 has a built-in analog-to-digital (A/D) converter unit which it is activated by the READ_VIN_AO subroutine. Referring to FIG. 4F, after the A/D converter unit is powered up, the subroutine clears the A/D result registers. Then, the subroutine clears all the interrupts and enables the A/D interrupt. After a pause, it clears the "A/D DONE" interrupt. Next, the conversion is started and the microcontroller enters a "sleep mode", until the conversion is complete. The sleep mode turns all the I/O functions into high impedances and shuts down all unrelated microcontroller subsystems, reducing switching noise during the conversion. Upon completion, the read input voltage (VIN) is stored and the A/D converter unit is powered down.

Figure 4G:
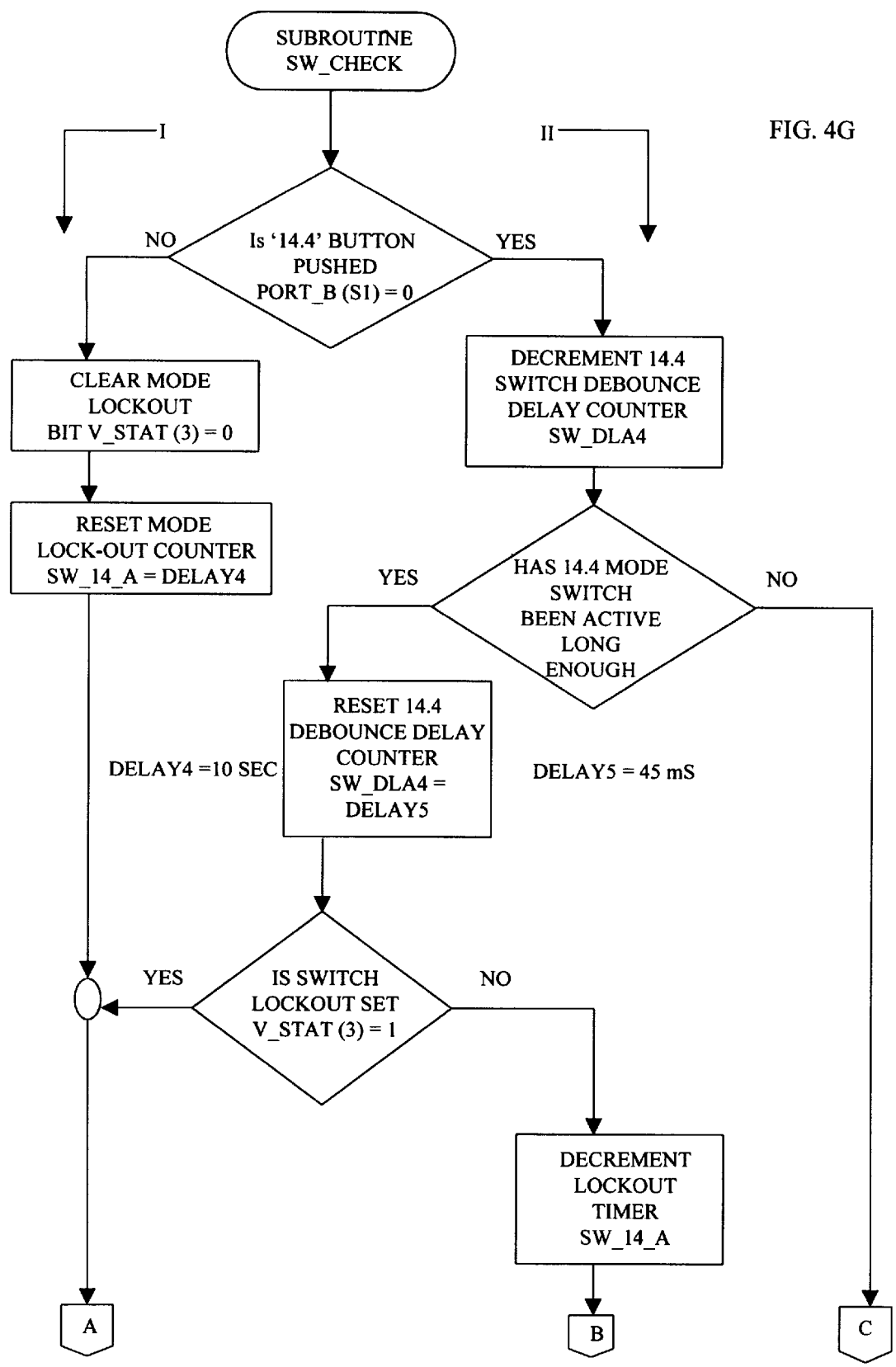

After reading the input voltage, the main program will check to see if any of the switches are active (in the embodiment of FIG. 2, there is only one-the "Boost" switch) by invoking subroutine SW_CHECK. Referring to FIGS. 4G–H, the subroutine first determines whether the Boost (14.4 V) switch is pressed. If the subroutine determines that the switch is pressed, the subroutine executes the instructions contained in the branch marked "II" in FIGS. 4G–H. When the user activates the Boost switch the signal may fluctuate. Therefore, a small delay (SW_DLA4) is included in the subroutine by way of the Boost switch debounce delay counter so that the system does not detect Boost Mode merely on noise.

While the delay counter decrements, the subroutine returns to the main program. Once the delay is complete, the subroutine resets the delay counter and then determines if the lockout bit was set (V_STAT(3)=1). If the Boost switch has been active longer than the debounce delay and the switch has not been pushed for too long, i.e., V_STAT(3)=0, the SW_CHECK subroutine continues to decrement the lockout timer (SW_14_A, the timer which monitors how long the switch has been pushed). If the lockout timer has not "timed-out" (SW_14_A=0) the routine determines which mode is desired based on how long the switch has been active (6 seconds or more-Storage Mode, 13.2 volts; less than 6 seconds but more than three seconds-Normal Mode; less than 3 seconds-Boost Mode, 14.4 volts).

Figure 4I:
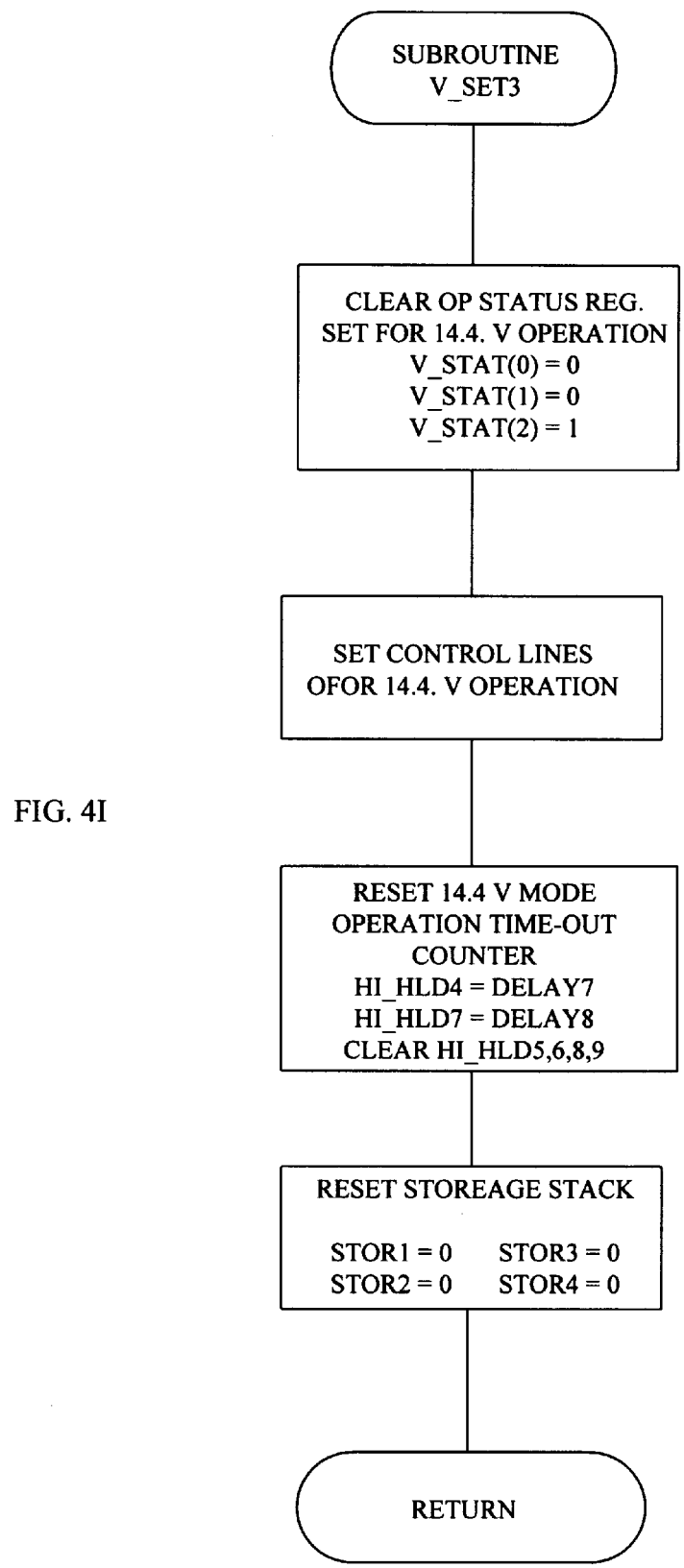
FIG. 4I is a flow diagram of the V_SET3 subroutine contained in the main program of FIGS. 4A–D and FIG. 5A used to carry out Boost Mode configuration.

When the Boost switch has been active for six seconds or more (but not long enough for the switch activation counter to time-out), the SW_CHECK subroutine calls the V_SET1 subroutine (FIG. 4M) which signals the power converter to output 13.2 V, i.e., pin 1 and pin 2 of the microcontroller 22 are not asserted. The subroutine then sets a flag (B_STAT(5)=1) to indicate that the Storage Mode was manually activated. Before returning to the main program, a flag is set (B_STAT(3)=1) to prevent the Auto Boost Mode from being initiated for one hour.

When the Boost switch has been active for more than three seconds but less than six seconds, the SW_CHECK subroutine calls the V_SET2 subroutine (FIG. 4E) which signals the power converter to output 13.6 V, i.e., pin 1 of the microcontroller 22 is asserted. The subroutine also sets a flag (B_STAT(4)=1) to indicate that the Normal Mode was manually activated. Before returning to the main program, a flag is set (B_STAT(3)=1) to prevent the Auto Boost Mode from being initiated for one hour.

When the Boost switch has been active less than three seconds, the SW_CHECK subroutine calls the V_SET3 subroutine (FIG. 4I) which signals the power converter to output 14.4 V, i.e., pin 2 of the microcontroller 22 is asserted. The subroutine then sets a flag (B_STAT(2)=1) to indicate that the Boost Mode was manually activated. At that point the subroutine passes control to the main program.

On the other hand, if the Boost switch is active beyond a predetermined time, the lockout timer would time-out (V_STAT(3)=1). This could happen either accidentally (i.e., if the user places something on top of the Boost switch thus leaving the button continuously engaged) or inadvertently (i.e., if the switch becomes shorted). If this time-out occurs, the subroutine sets the lockout flag (V_STAT(3)=1) and returns the system to Normal mode (13.6 V) by activating pin 1 of the microcontroller 22 in order to prevent damaging the battery. In addition, a flag is set (B_STAT(3)=1) to prevent the Auto Boost Mode from being initiated for one hour.

Returning the system to Normal Mode operation is particularly desirable if the operator has intentionally held the Boost switch active beyond a predetermined maximum time. Although the control module will exit Boost Mode when one of the Boost Mode timers (described hereinafter) expires, in this situation the operator can force the software to exit Boost Mode without waiting for the expiration of one of the timers. Control is then returned to the main program.

If the Boost switch is not active, the subroutine executes the instructions contained in the branch marked "I" in FIGS. 4G–H. In this case, the mode lockout flag (V_STAT(3)) and the mode lockout timer (SW_14_A) will be reset. The subroutine SW_CHECK then passes control to the main program.

Figure 4J:
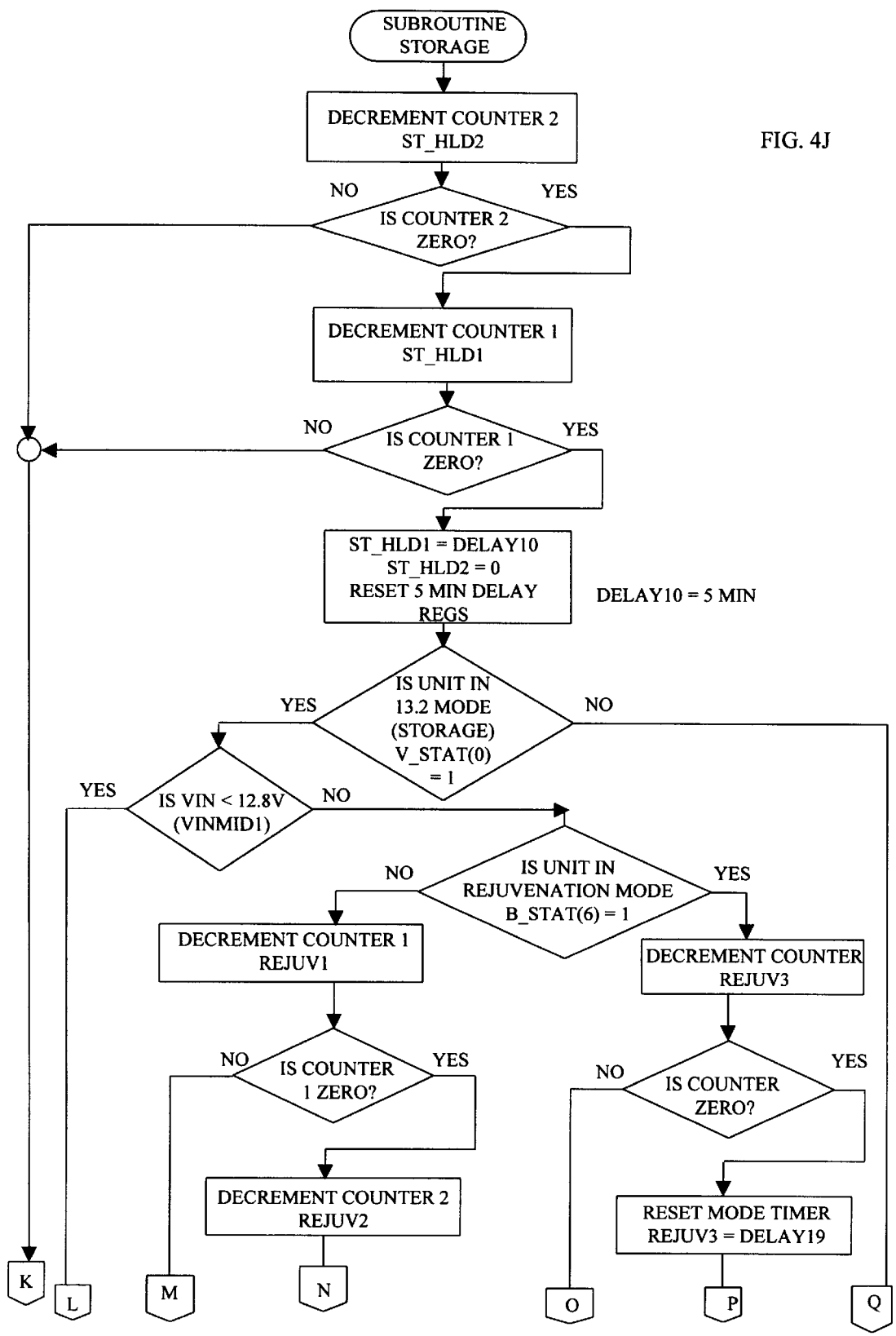
FIGS. 4J–L are flow diagrams of the STORAGE subroutine contained in the main program of FIGS. 4A–D and FIG. 5A, used to control Storage/Trickle Mode.
Figure 4K:
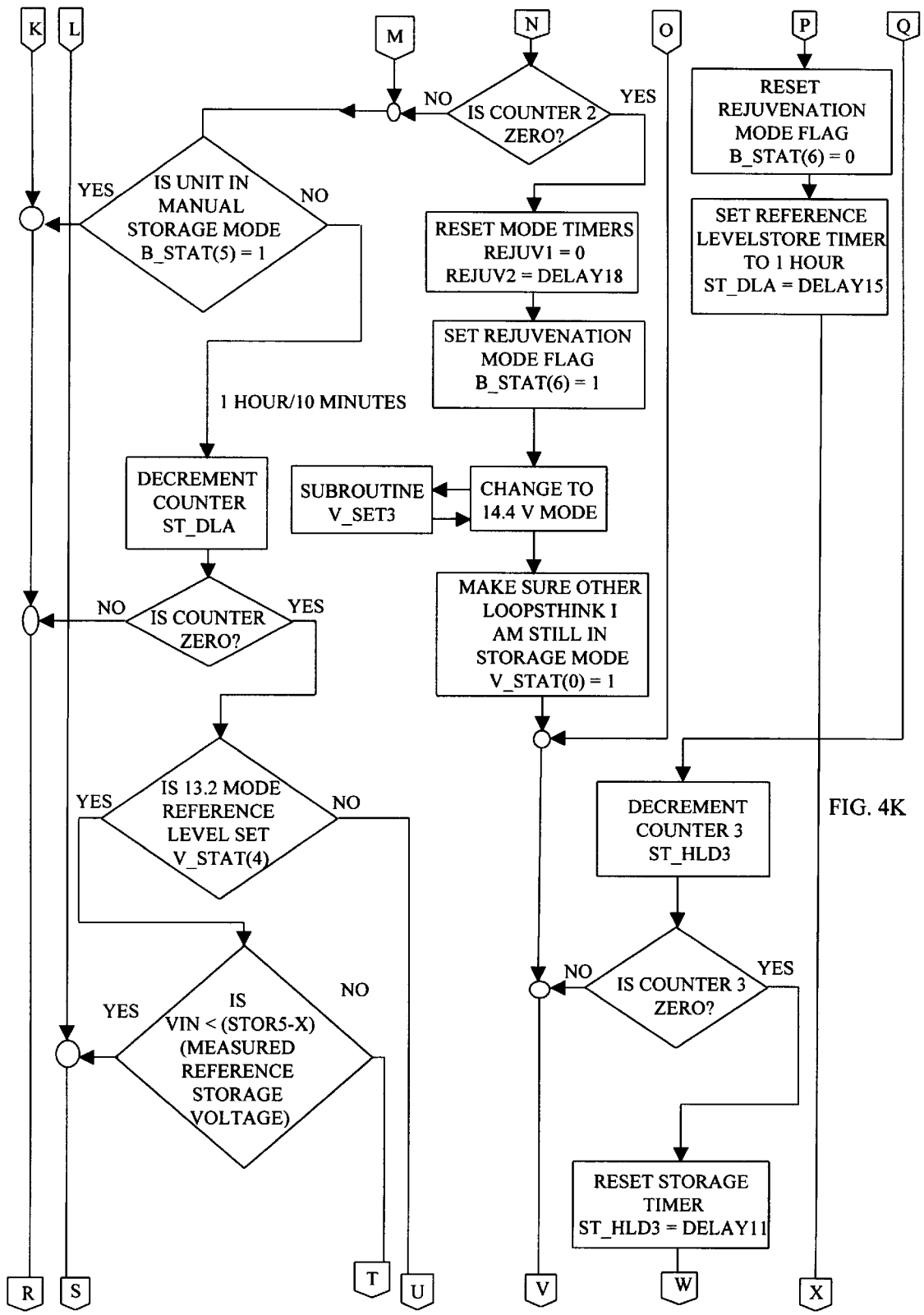
Figure 4L:
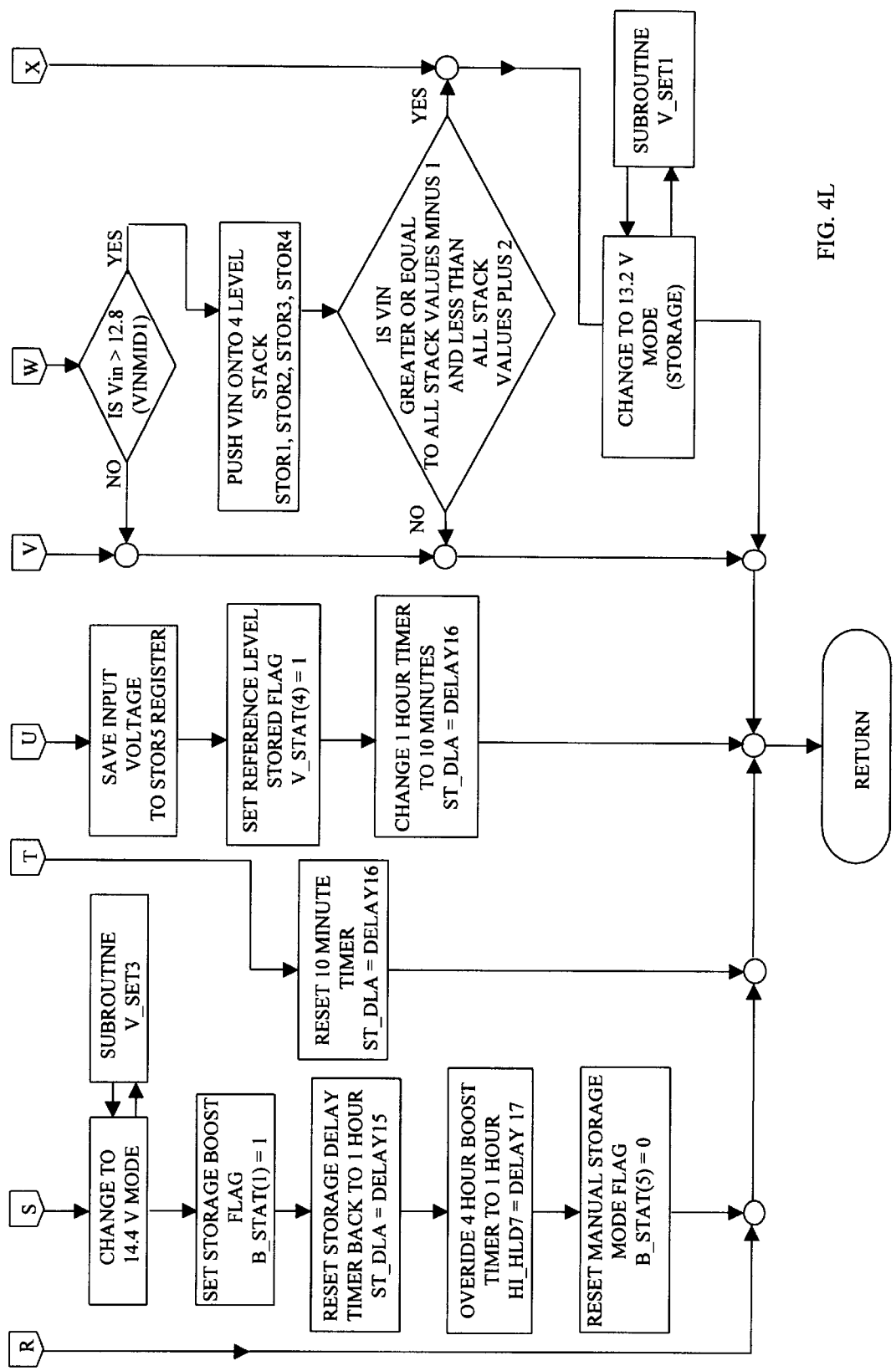
Figure 4M:
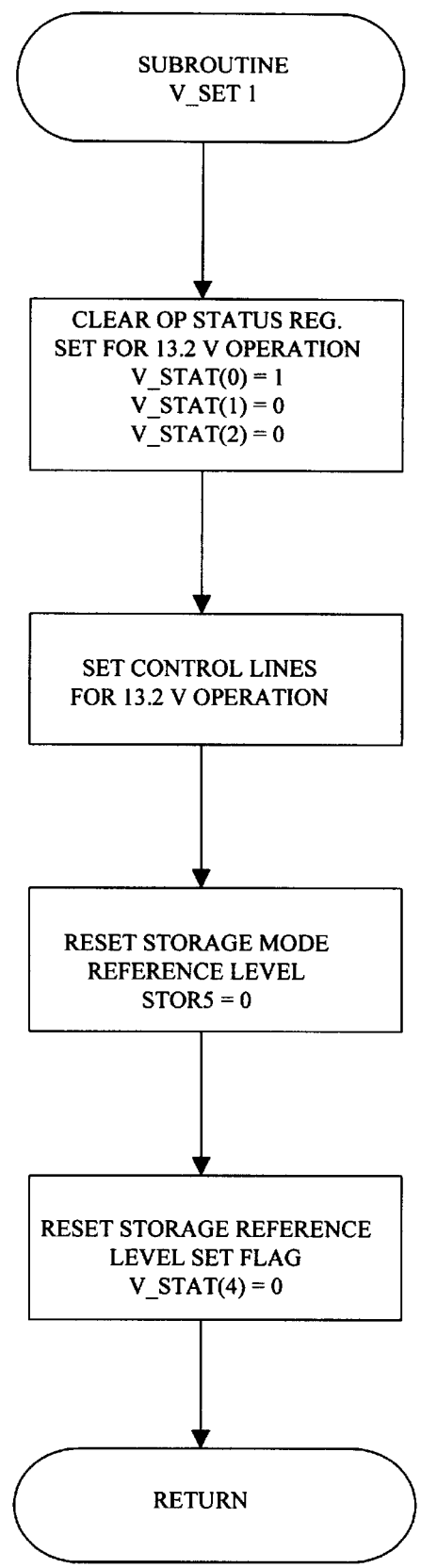
FIG. 4M is a flow diagram of the V_SET1 subroutine contained in the main program of FIGS. 4A–D and FIG. 5A, used to carry out Storage Mode configuration.

Next, the main program determines whether the power converter should be in Storage Mode by invoking the STORAGE subroutine (FIGS. 4J–L). While in the Storage Mode, the battery output voltage (VIN) is tracked in order to determine whether the Storage Mode should be exited. The STORAGE subroutine employs various counters (e.g., ST_HLD1, ST_HLD2, ST_HLD3 and ST_DLA), which are checked periodically while the subroutine is active. The subroutine then determines whether the control module should put the power converter in Storage Mode, i.e., 13.2 V. If not, the timers are repeatedly checked as the rest of the subroutine is executed (discussed below). If the control module has directed the power converter to enter the Storage Mode, the program executes the following instructions.

When the control module 10 provides the storage control signal to the power converter 12, the power converter output voltage decreases from 13.6 V to 13.2 V. The battery output voltage cannot instantly change, hence the excess charge is bled-off. (This is one reason for the delay in checking the timers.) After this initial delay, the power converter enters Storage Mode (providing V_STAT(0)=1). The subroutine then checks as to whether the input voltage (VIN) is less than 12.8 volts (VINMID1). If VIN is less than 12.8 volts the routine sets the power converter to the Boost Mode (14.4 V). If VIN is not less than 12.8 volts, the routine checks to see if the power converter should be in the Rejuvenation (Desulfation) Mode (B_STAT(6)=1).

If the Rejuvenation Mode is not active, after certain counters (REJUV1 and REJUV2) expire, the unit is placed in the Rejuvenation Mode (Boost mode). After the control module has been in the Rejuvenation Mode for a period (15 minutes in the preferred embodiment) set by another counter (REJUV3) the power converter, under control of the control module, returns to the Storage Mode. If the input voltage (VIN) drops more than X volts (where X is, for example, 60 mV) below a reference voltage (STOR5) while in the Storage Mode, the subroutine invokes the Boost Mode to change back to a 14.4 volts. A flag is then set (B_STAT(1)=1) indicating that the Boost Mode was initiated by the STORAGE subroutine and several storage registers are also cleared.

Essentially, the program attempts to determine whether, after the power converter has been in Storage Mode for a certain time, the user began using any load device. If so, there would be a measurable drop in battery output voltage. At this point, the subroutine directs the unit to exit Storage Mode and returns to the main program. On the other hand, if the battery voltage has not changed, i.e., the battery voltage is not less than the value of the Storage Mode reference voltage (STOR5) minus one, the system stays in the Storage Mode and the STORAGE subroutine is exited with control returning to the main program.

Prior to putting the power converter in Storage Mode (13.2 volts), the program will wait twenty-four hours because it may take a day or more for the battery to stabilize after it has been in use. In order to implement this operation, the program executes a counter loop, which will delay the reading of the battery output voltage (VIN) for six hours. Then, every six hours, the program stores the battery output voltage onto a stack of registers (STOR1, STOR2, STOR3 and STOR4). Thereafter, the program asks whether the battery output voltage has changed and, in particular, whether the voltage has not changed for twenty-four hours. The program does this by asking whether the battery output voltage is greater than or equal to all the stack values minus one and whether it is less than all the stack values plus two. If not, the system is not ready to enter the Storage Mode because the battery output voltage has changed. In this case, either the battery is not fully charged or a load device is being used. Therefore, the program exits the STORAGE subroutine and returns to the main program.

However, if the battery voltage is within the limits set by the subroutine, i.e., the battery has been dormant, the STORAGE subroutine (FIGS. 4J–L) invokes the V_SET1 subroutine (FIG. 4M) thus signaling the power converter to charge at 13.2 V, i.e., Storage Mode. Finally, when it invokes the V_SET1 subroutine, the STORAGE subroutine resets the timers and returns to the main program.

Another feature of the invention is that the microcontroller 22 incorporates an alternate means of exiting Boost Mode. If the battery output voltage reaches 14.0 V, it has been fully charged and there is no reason to remain in Boost Mode. Therefore, in order to protect the battery, the control module contains a voltage limit (in addition to the time limit discussed earlier) which signals the power converter to return to Normal Mode after four hours. Although the voltage limit might seem to eliminate the need for a time limit, this is not so. If the voltage limit is set at, for example, 14.0 V and there is a relatively large load on the battery and power converter due to heavy use, the power converter may not be able to charge the battery up to this limit. As a result, the power converter would continue to apply the full Boost Mode charge as long as these conditions prevailed, however extended that might be, and the battery could be damaged. Therefore, the dual method of exiting the "Boost" Mode on either a voltage limit or time limit operates to ensure that the battery is protected.

Figure 4N:
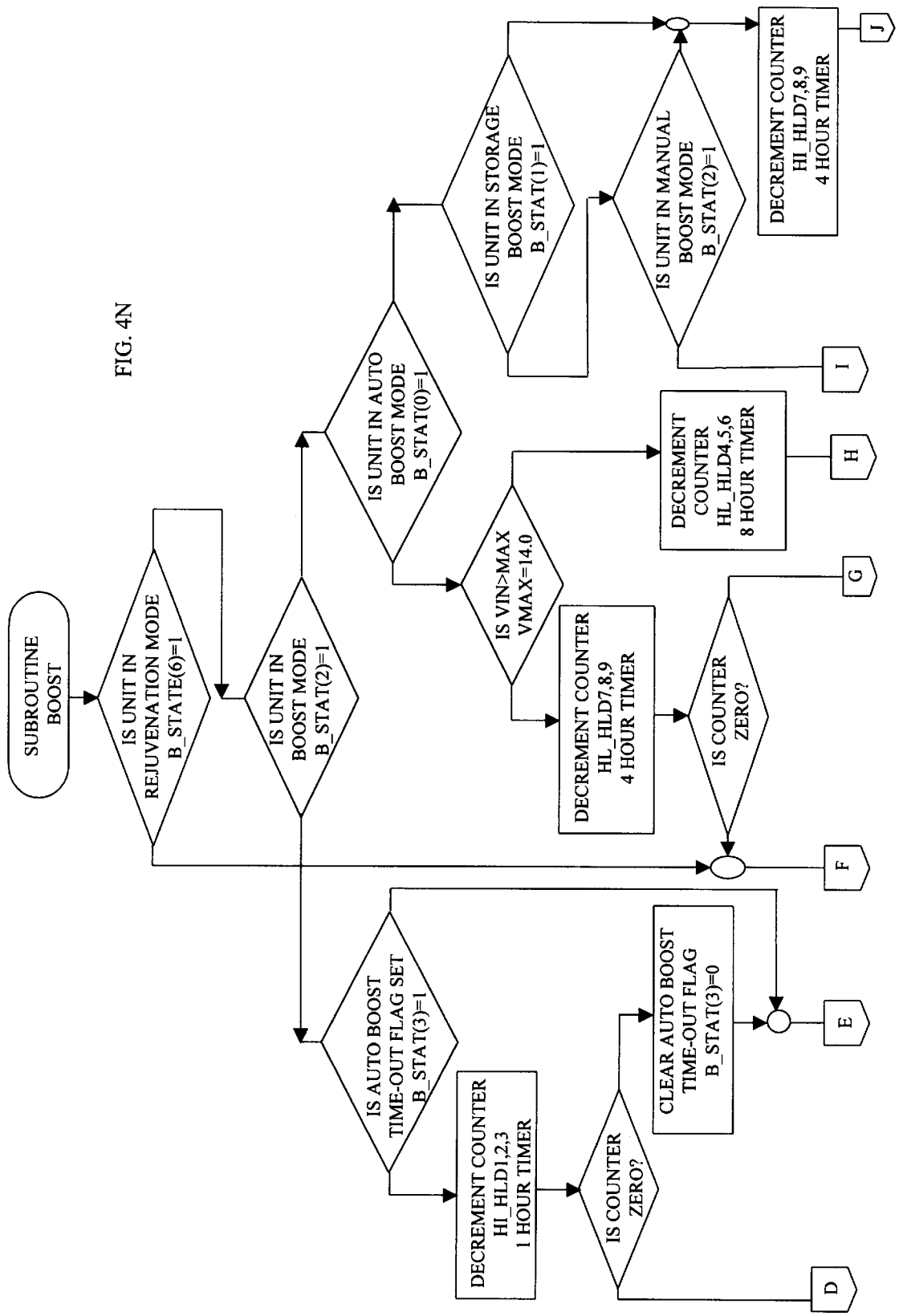
Figure 40:
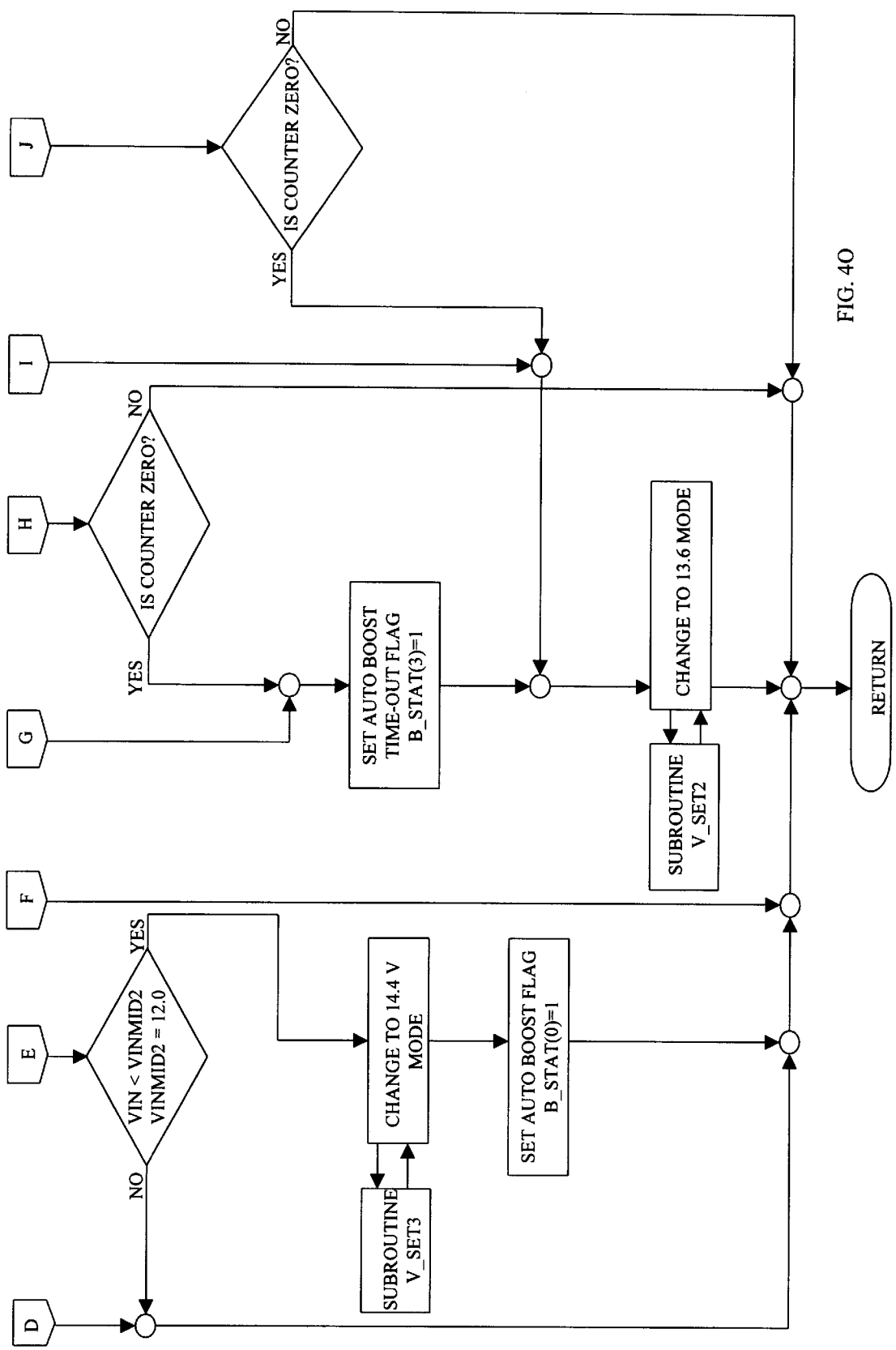

Overall, the control module 10 can activate Boost Mode in any of four different ways as shown in the Boost subroutine (FIGS. 4N–O). First, if the Boost Mode is entered as a Rejuvenation Mode (B_STAT(6)=1) while the power converter is in the Storage Mode, Second, if the user manually activates the Boost switch 28 (FIG. 2), the microcontroller 22 outputs a boost control signal directing the power converter 12 to charge at 14.4 V (B_STAT(2)=1). The microcontroller 22 then continues to signal the power converter to charge in Boost Mode for four hours. Third, the power converter may enter Boost Mode automatically when it has been "awakened" from Storage Mode (B_STAT(1)=1). In this case, the program will also signal the power converter to charge in Boost Mode for four hours. Finally, the power converter may enter Boost Mode automatically during execution of the Boost subroutine based on the battery output voltage (VIN) obtained by invoking the READ_VIN_AO subroutine (FIG. 4F).

If the battery voltage drops below a certain point (VINMID2), the Boost routine invokes Auto Boost. In Auto Boost the power converter will run for a maximum of eight hours unless the battery voltage rises above 14.0 volts in which case the power converter will run for four hours after the 14.0 volt level is detected. If the power converter runs eight hours without exceeding 14.0 volts, the power converter switches to the Normal Mode. Thereafter, the power converter cannot go into Auto Boost for one hour. This functions, in part, to prevent excessive boil-off of the battery electrolyte.

Figure 4P:
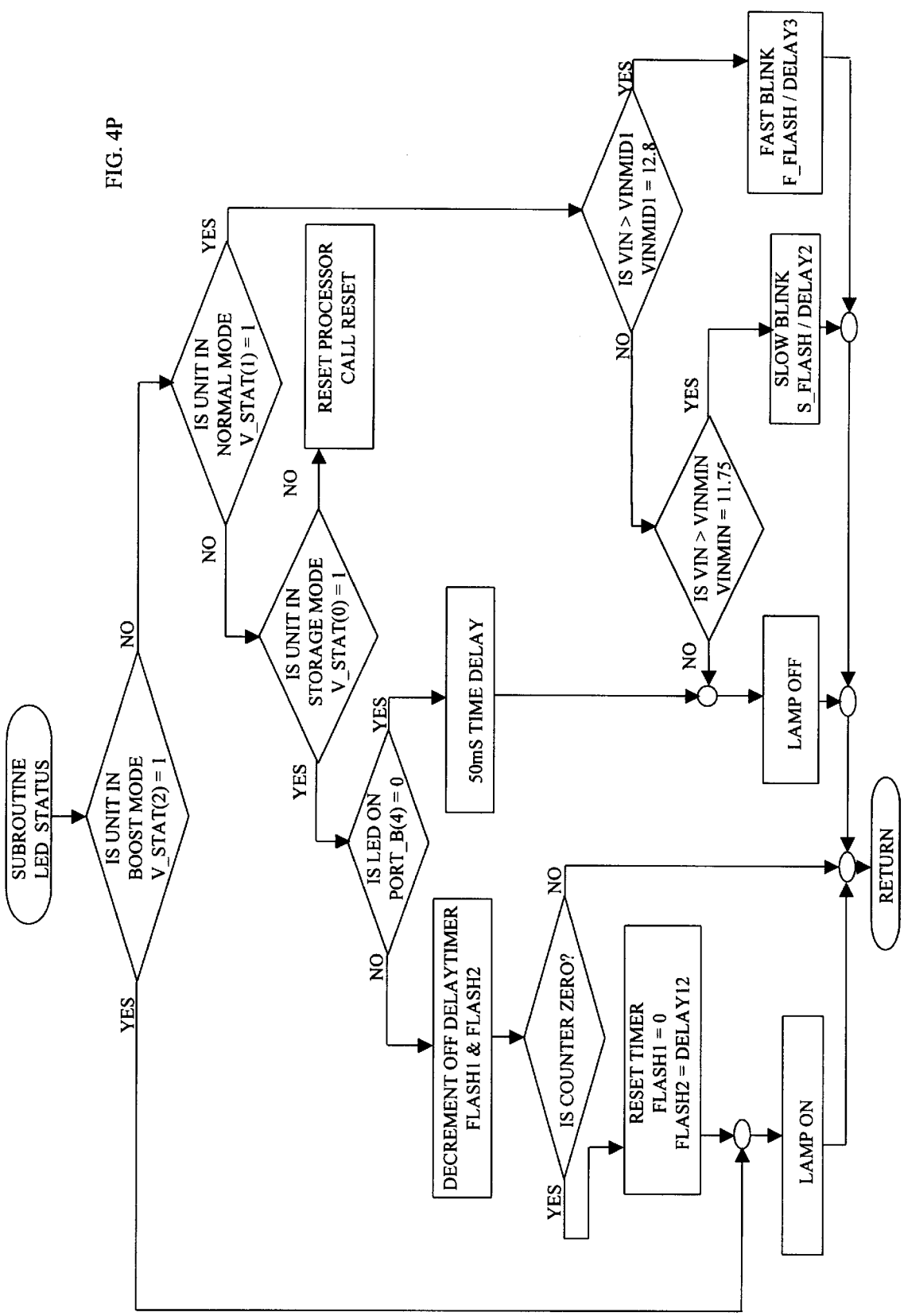
FIG. 4P is a flow diagram of the LED_STATUS subroutine contained in the main program of FIGS. 4A–D, used to control the LED status indicator.

According to another aspect of the invention, there is an LED indicator for displaying system status (FIG. 4P). When the LED of the control module is on continuously, the power converter is in the Boost Mode. When the LED is flashing rapidly the power converter is in Normal Mode and the battery is either at full charge or is being charged. When the LED is flashing slowly the power converter is in Normal Mode and the battery is at greater than 50% charge (VIN>11.75 V). If the LED flashes at a very slow rate, the system is in the Storage Mode. If the LED is off, the battery is at less than 50% charge (VIN<11.75 V).

Figure 3:
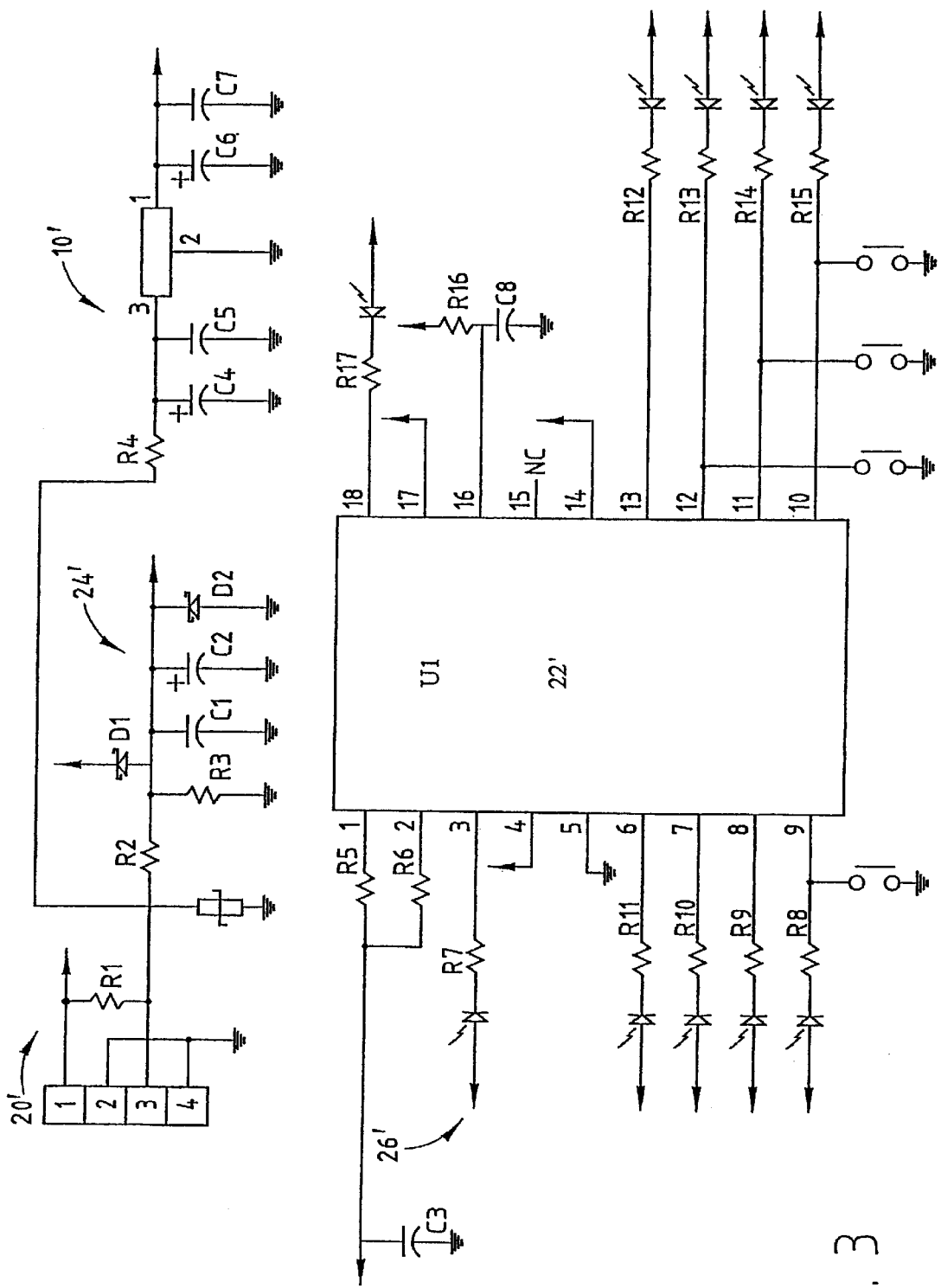
FIG. 3 is a schematic diagram of another preferred control module including a microcontroller, according to another embodiment of the invention.
Figure 5A:
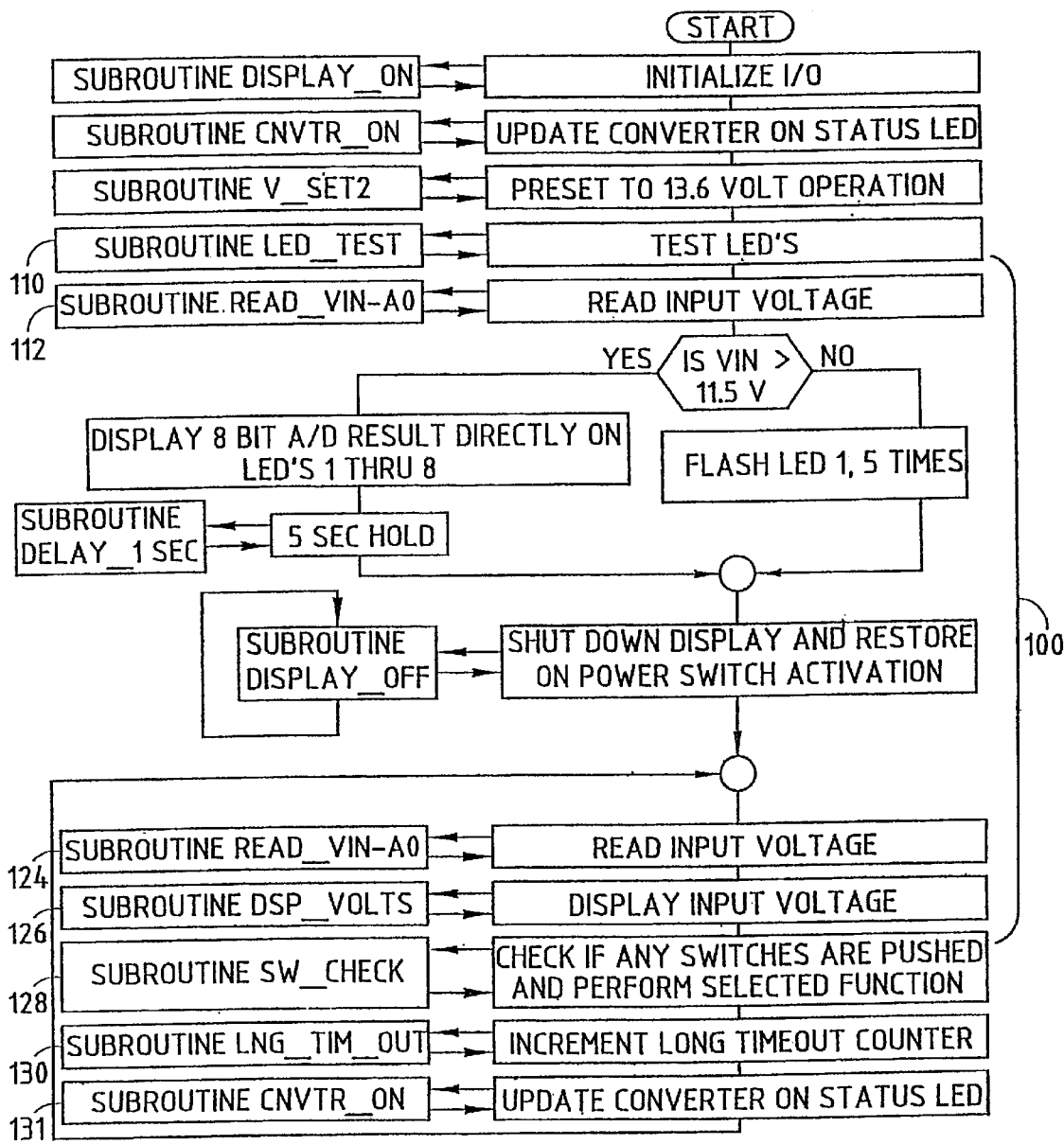
FIG. 5A is a flow diagram of the main program stored in the memory of the microcontroller of the embodiment illustrated in FIG. 3.
Figure 5B:
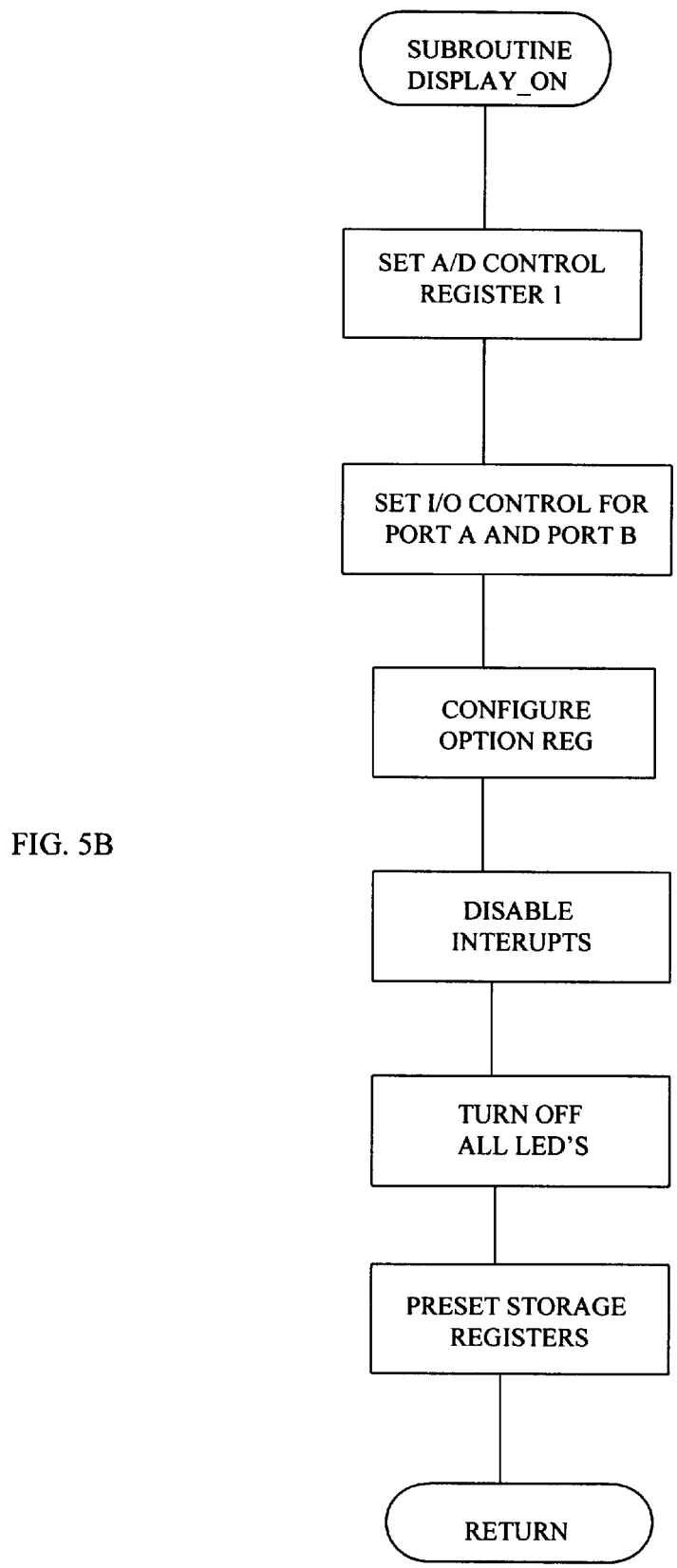
FIG. 5B is a flow diagram of the DISPLAY_ON subroutine invoked by the program of FIG. 5A.
Figure 5C:
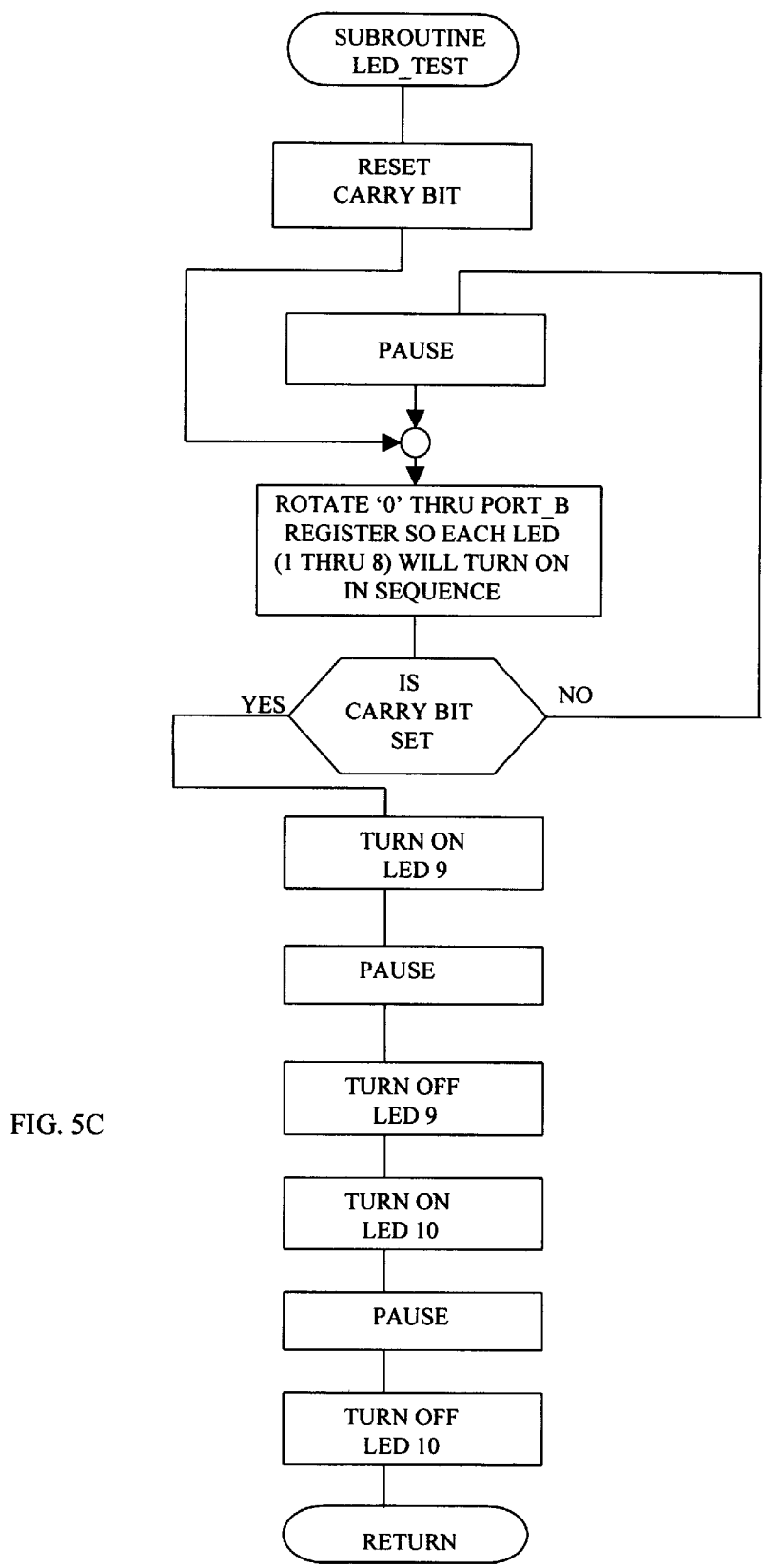
FIG. 5C is a flow diagram of the LED_TEST subroutine invoked by the program of FIG. 5A.
Figures 1, 2, 5D:
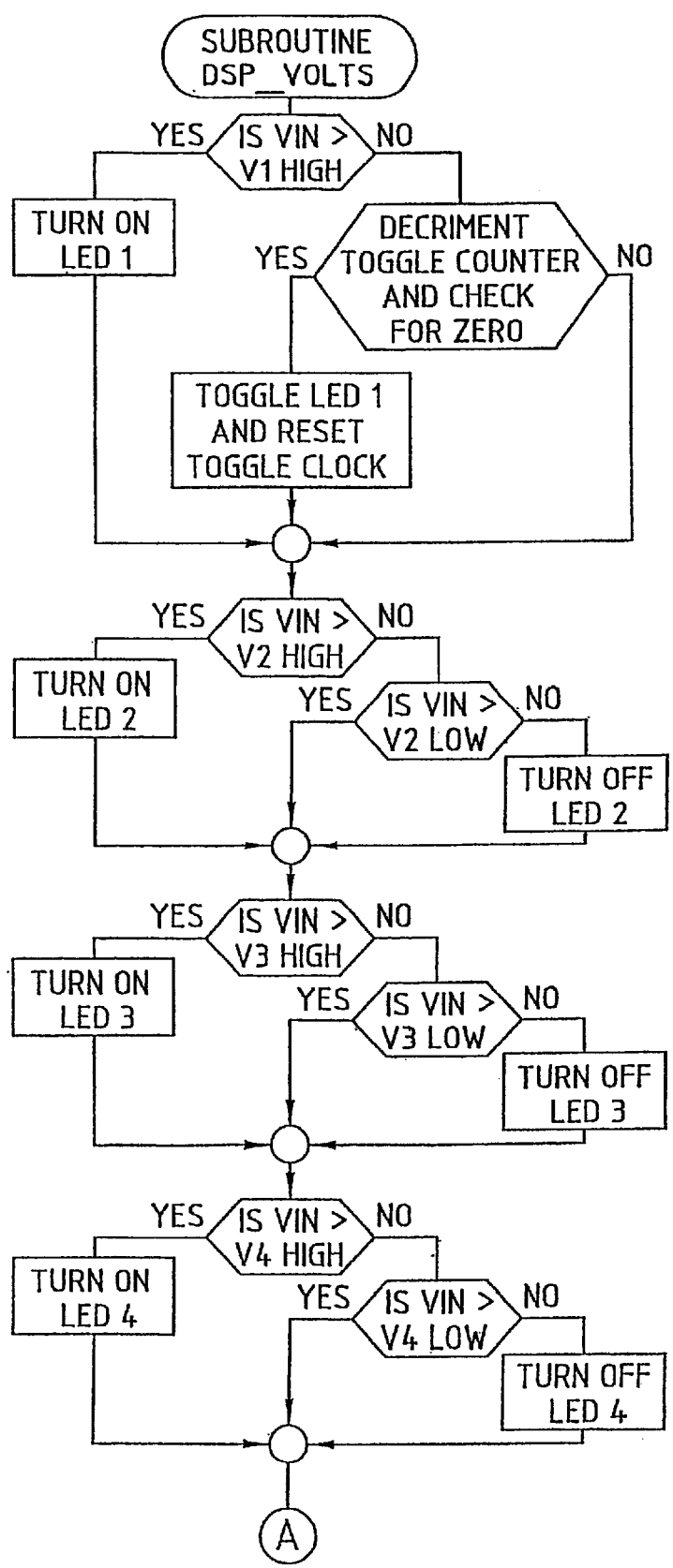
FIG. 5D is a flow diagram of the DSP_VOLTS subroutine invoked by the program of FIG. 5A.
Figures 2, 5D:
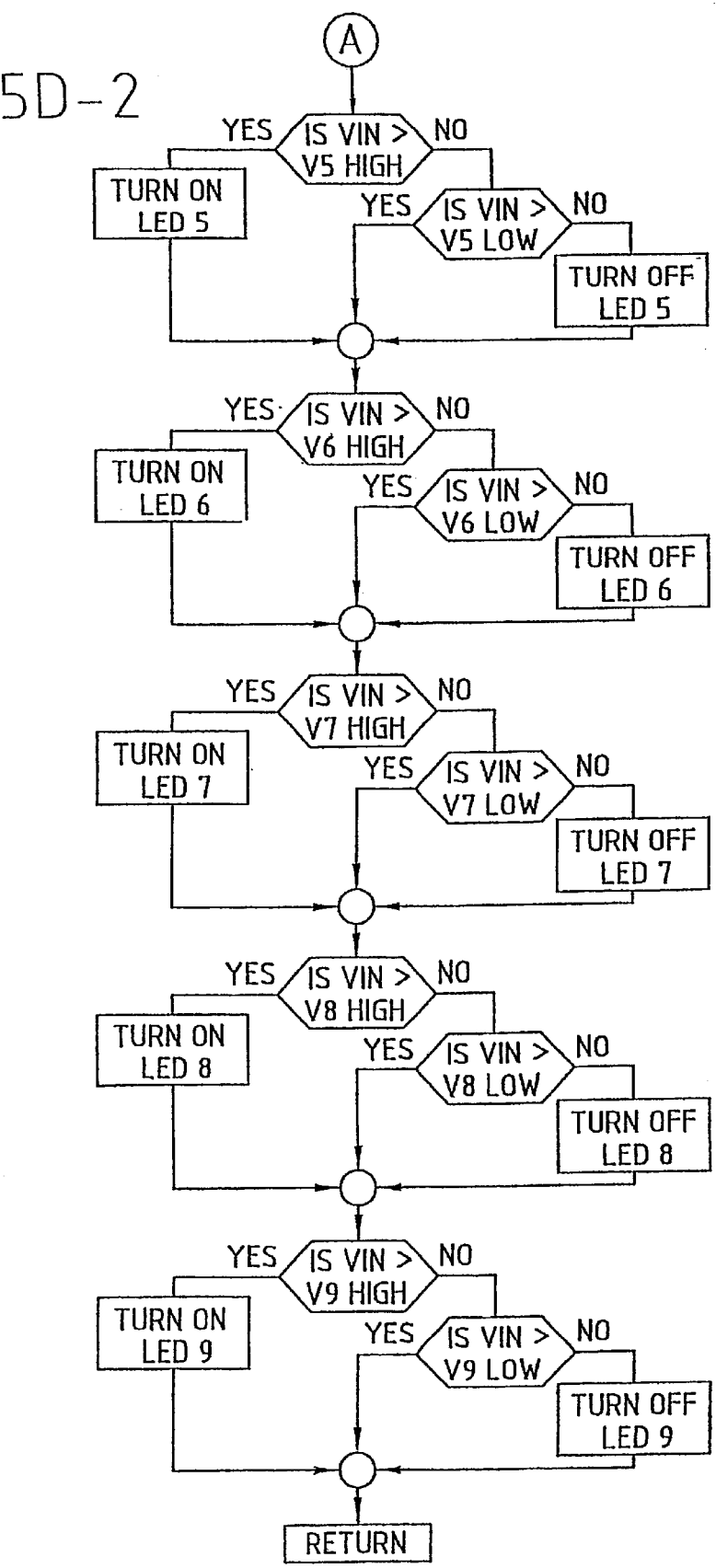
Figures 1, 2, 5E:
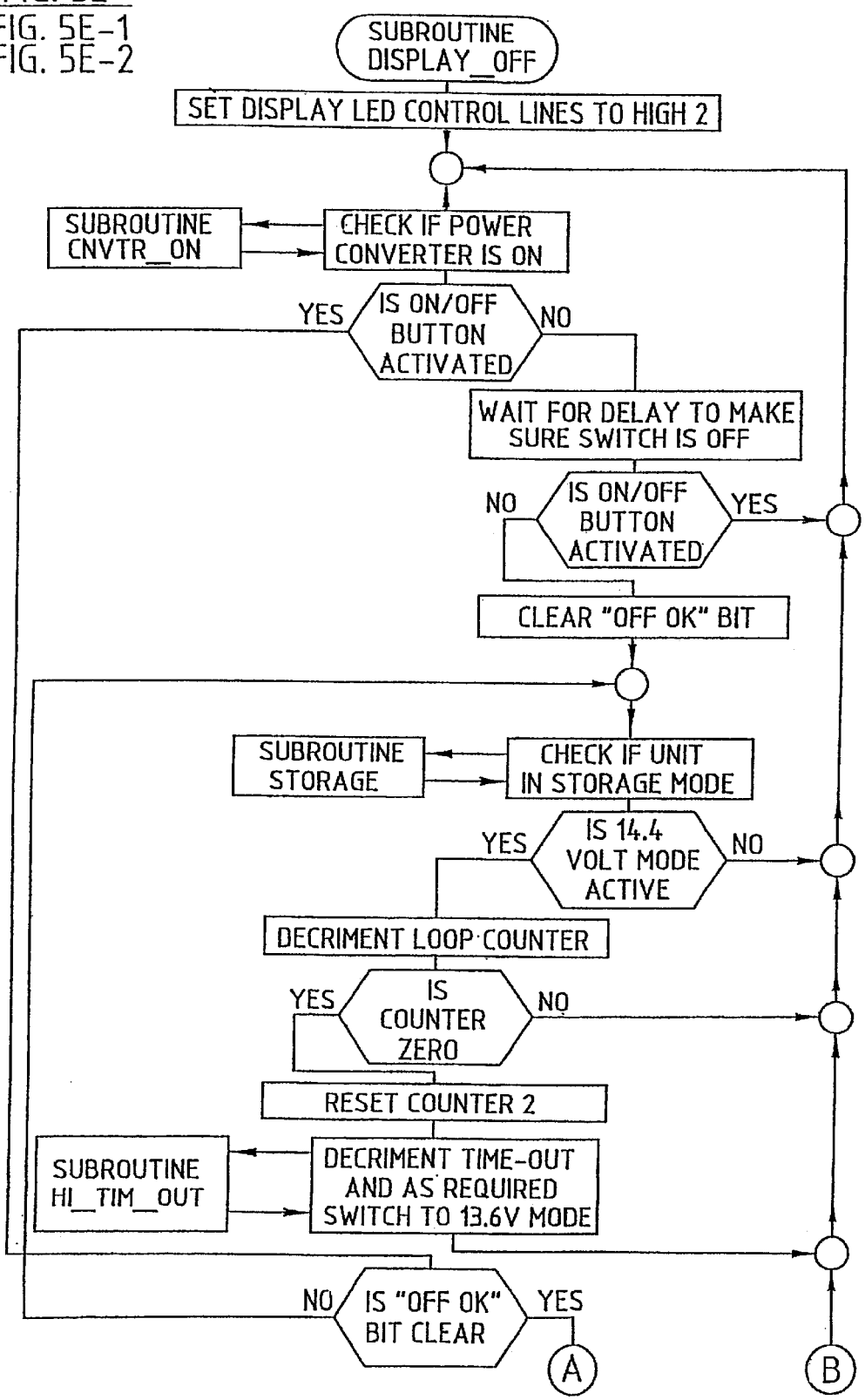
FIG. 5E is a flow diagram of the DISPLAY_OFF subroutine invoked by the program of FIG. 5A.
Figures 2, 5E:
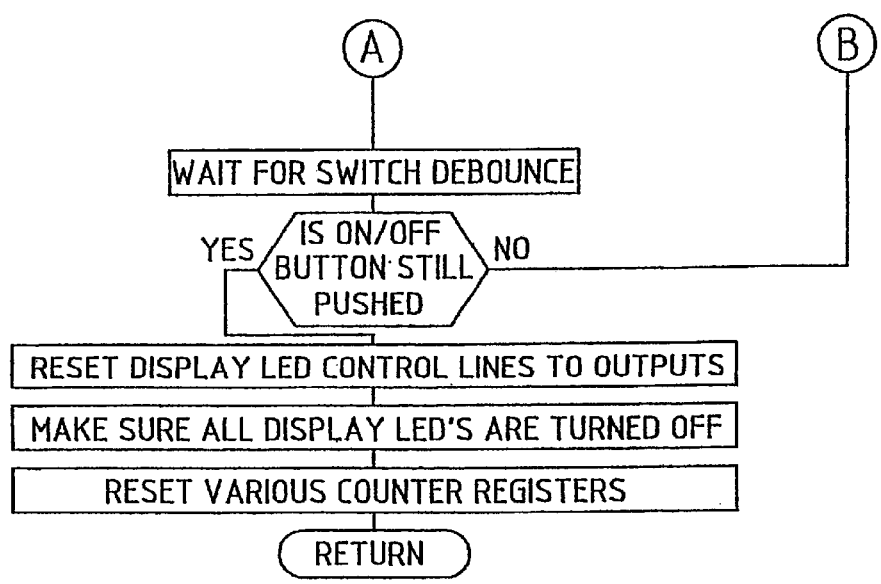

An alternate embodiment of the invention is shown in FIG. 3. The operation of this embodiment is shown by the series of flow diagrams in FIGS. 5A–5J inclusive, and in general is very similar to the operation described above. As shown is FIG. 5A, the main program invokes a series of routines to initialize the I/O, turn the display on (FIG. 5B), and preset the system to Normal Mode (V_SET2, FIG. 4E). Like the first embodiment, when the connector of the control module is plugged into the power converter, the 1M load between node three on the connector (the input) and node one on the connector (the output) causes the power converter to change its charge from 13.6 V to 13.2 V. Thereafter, if either pin 1 or pin 2 on the microcontroller 22' is pulled low, the microcontroller will signal the power converter to charge in "Normal" Mode (13.6 V) or "Boost" Mode (14.4 V), respectively.

In addition, the main program (FIG. 5A) incorporates a series of routines 100 to implement a way of localizing problems with the assistance of the manufacturer. First, the program will blank the individual LEDs (LED_TEST 110) in order to make sure they are all connected when power is originally applied to the display. Then the program will instruct the processor to read the input voltage (VIN) (at step 112, using the READ_VIN_A0 subroutine shown in FIG. 4F). Thereafter, the program will ask whether this voltage is less than 11.5 V in order to check the status of the battery. If the voltage is below 11.5 V, the battery is almost dead (less than 50% charge) and the LED indicating the lowest voltage (11.7 V, shown at pin 9 of microcontroller 22' in FIG. 3) will flash five times. The program will then instruct the microcontroller 22' to turn the display off.

On the other hand, if the input voltage is above 11.5 V, the contents of the A/D register are displayed. When a problem is encountered, the user reads the digital output (displayed when the control module is unplugged and then plugged in again) which stays up for approximately five seconds. The user then relays this information to the manufacturing service department which will attempt to identify the problem. Additionally, the user can place a voltmeter across the battery to provide the service department with further information regarding the possible problem. When complete, the display shuts off and the system enters an energy conservation mode.

Next, the program enters a similar subroutine (SW_CHECK, FIG. 5F) as implemented in the first embodiment. First, the main program instructs the microcontroller 22' to read the input voltage (READ_VIN_$_A$0) 124. Then, unlike the first embodiment, the program displays the input voltage by invoking subroutine DSP_VOLTS (FIG. 5D) 126. As described previously, assuming the display is on (either automatically when the main program is initialized or manually when the user engages switch PB1 shown connected to pin 9 of microcontroller 22' in FIG. 3), if the input voltage is less than the threshold voltage for the lowest LED indicator (11.7 volts) the program will flash the LED to signify that the battery is almost dead. The program will update the battery status every time it cycles through the control loop checking the switches (32' in FIG. 3) for each mode of operation (128, FIG. 5A).

In addition to checking the "Boost" Mode switch described in the first embodiment, the SW_CHECK subroutine of this embodiment (FIG. 5F) checks each mode of operation during every cycle. Furthermore, each mode of operation (13.2 V, 13.6 V and 14.4 V) may be checked manually with the series of switches, PB2, PB3, and PB4, shown in FIG. 3 connected to pins 12, 11 and 10 of the microcontroller 22'.

Figures 2, 5F:
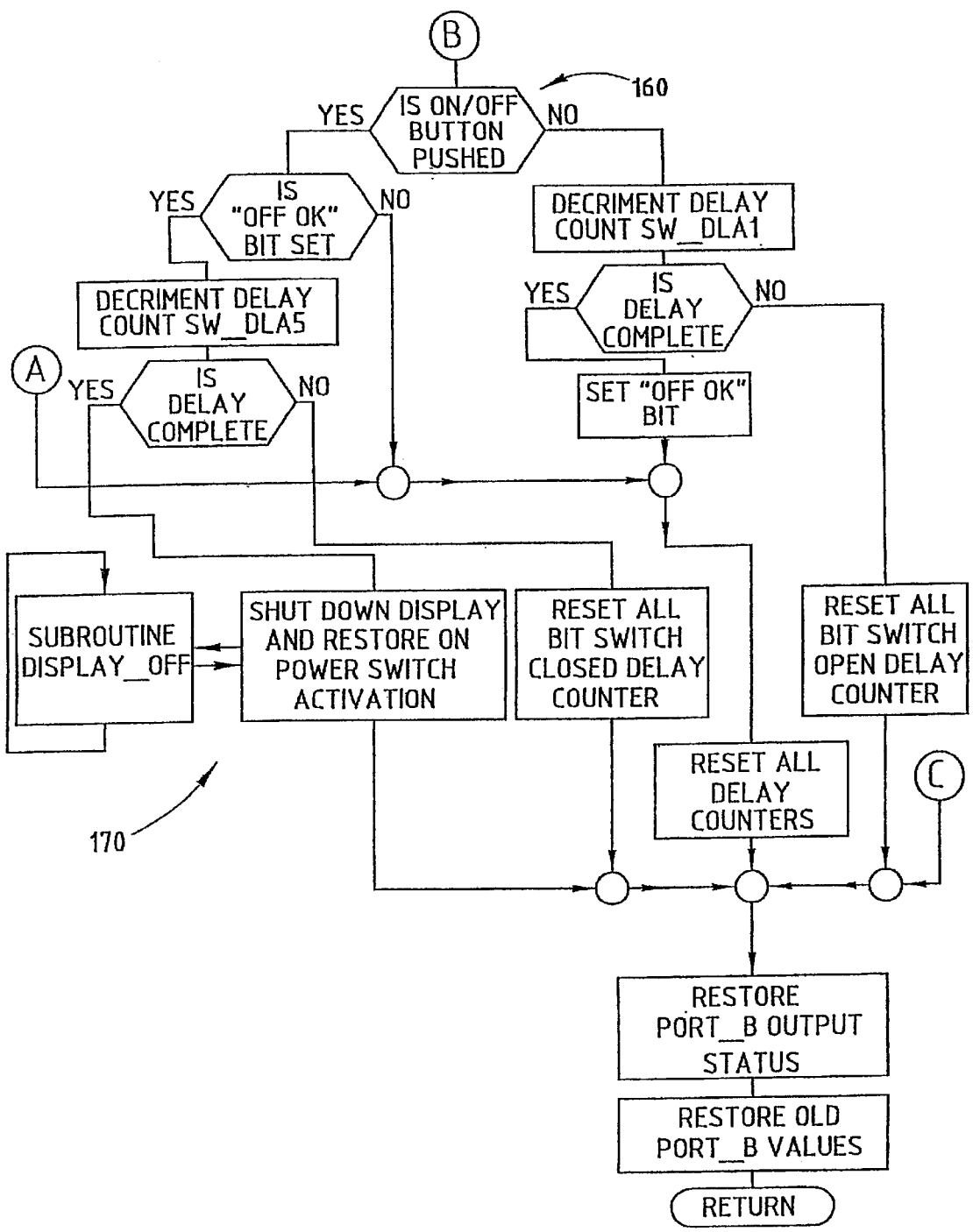
FIG. 5F is a flow diagram of the SW_CHECK subroutine invoked by the program of FIG. 5A.
Figure 5G:
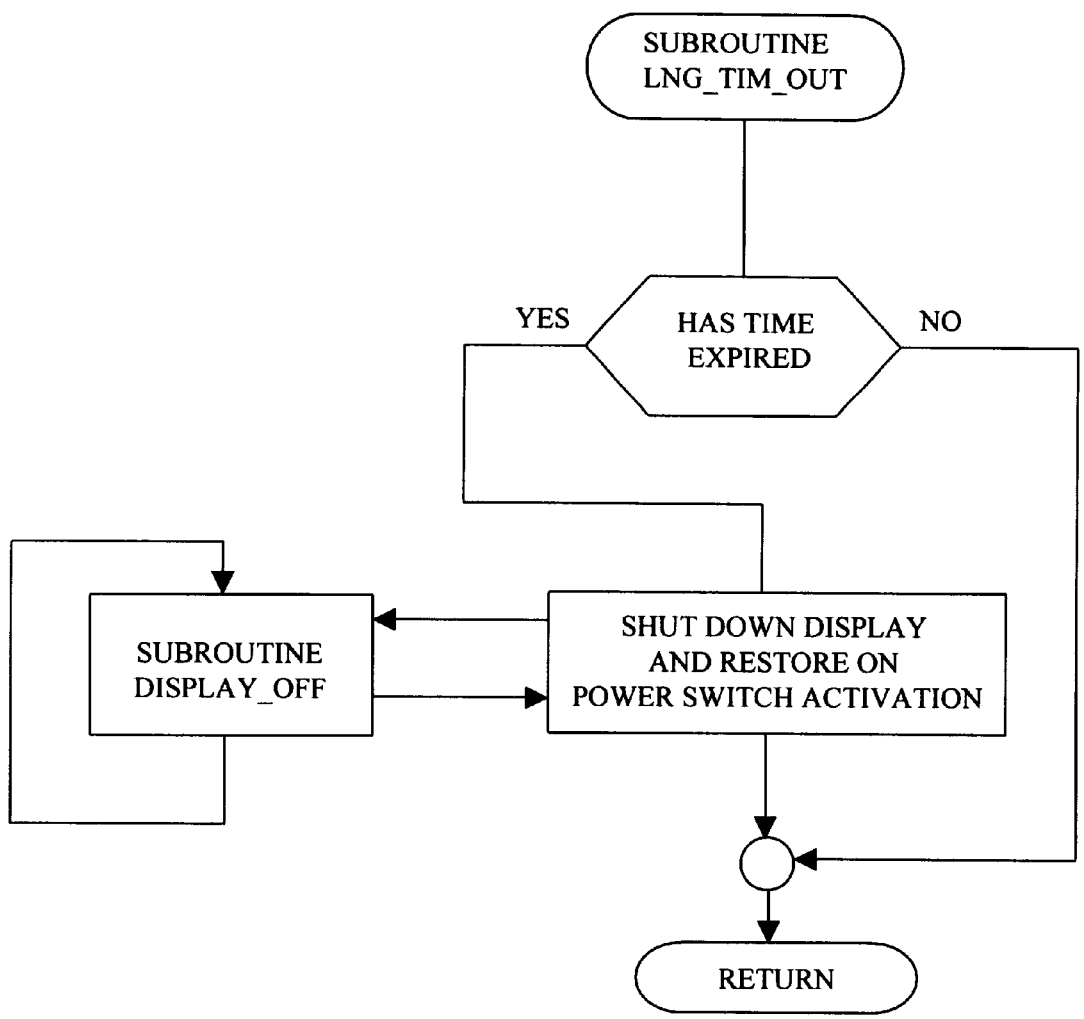
FIG. 5G is a flow diagram of the LNG_TIM_OUT subroutine invoked by the program of FIG. 5A.
Figure 5H:
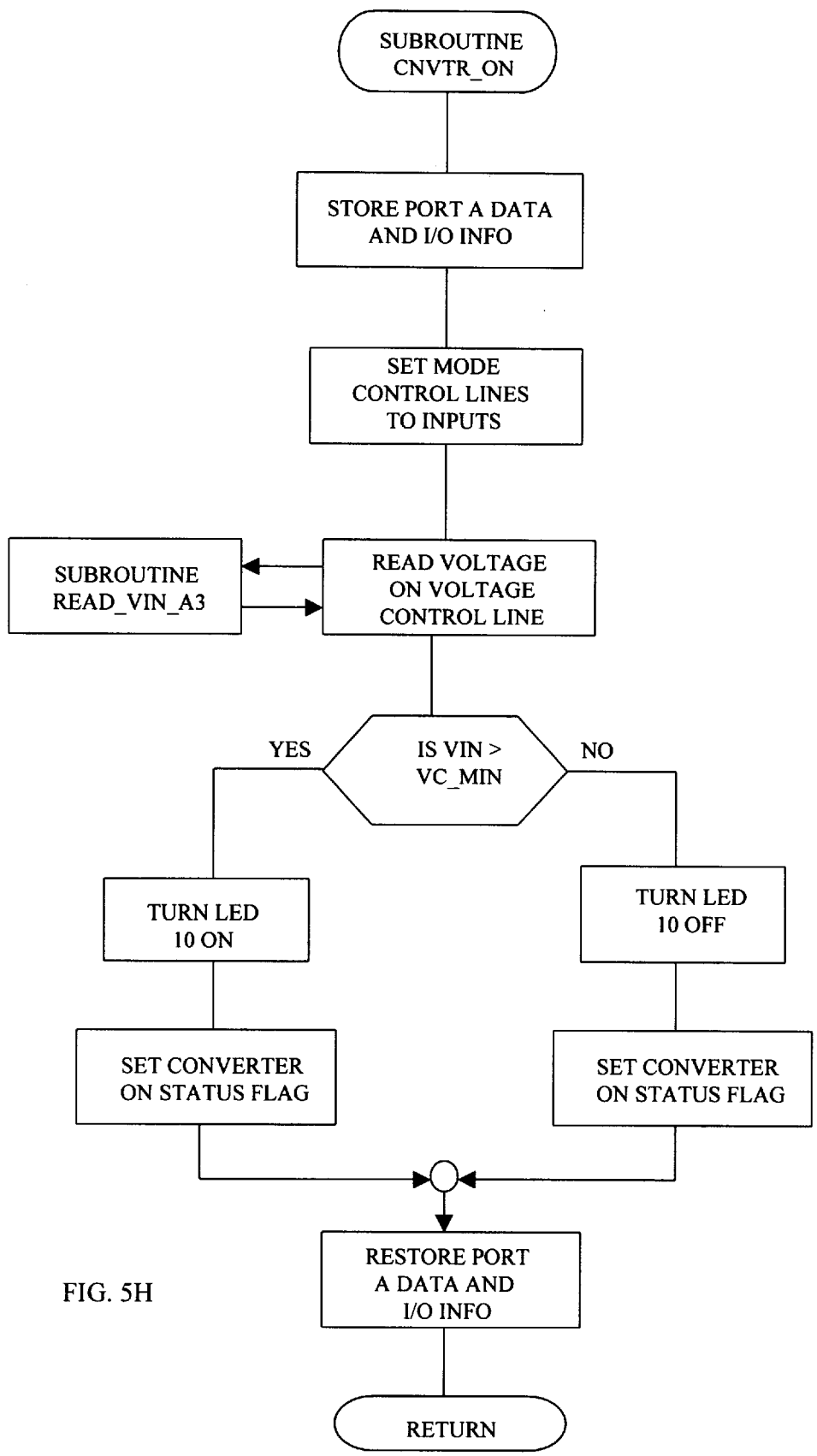
FIG. 5H is a flow diagram of the CNVTR_ON subroutine invoked by the program of FIG. 5A.
Figure 5I:
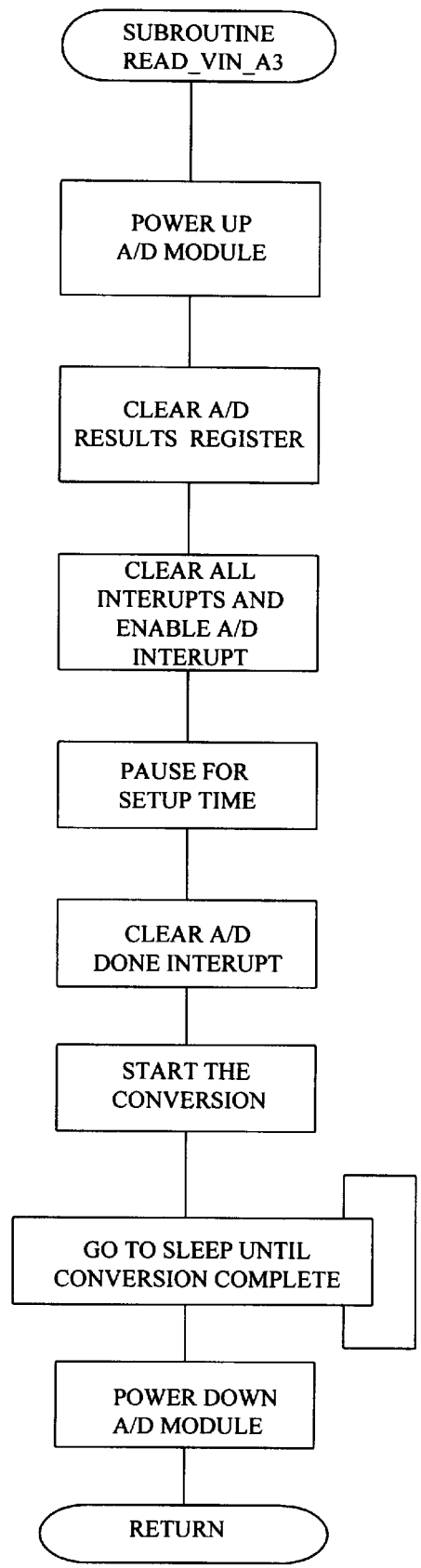
FIG. 5I is a flow diagram of the READ_VIN_A3 subroutine invoked by the program of FIG. 5A.
Figure 5J:
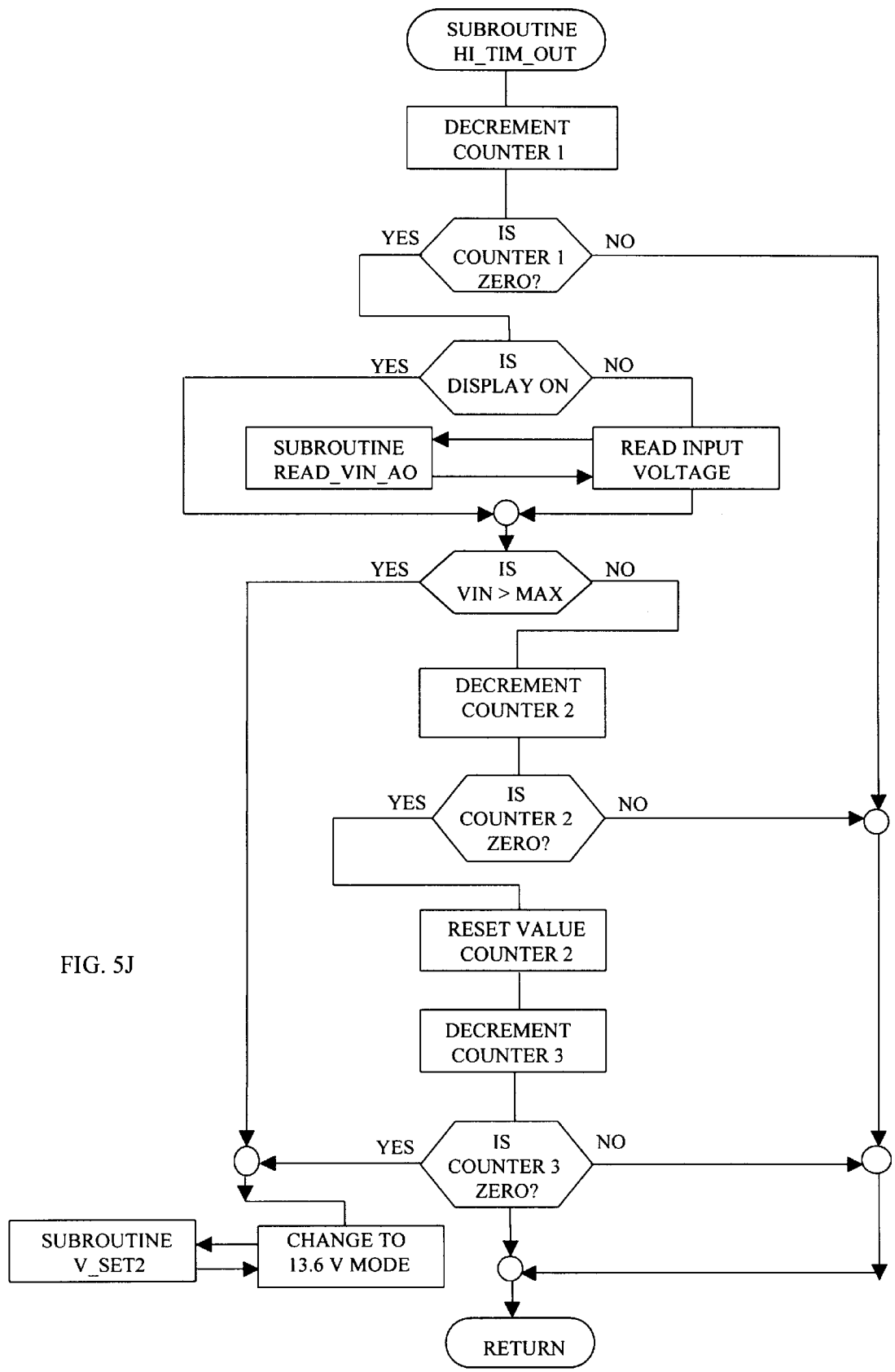
FIG. 5J is a flow diagram of the HI_TIM_OUT subroutine invoked by the program of FIG. 5A.

The steps of the SW_CHECK subroutine are illustrated in FIG. 5F. After initializing the system (132), the subroutine instructs the microcontroller to check whether the switch for Storage Mode (13.2 V) operation is engaged (134). Similar to the Boost Mode subroutine in the first embodiment, the program contains a delay (136) to ensure that the switch has completely debounced, i.e., to ensure that the program does not trigger merely on noise.

Next, subroutine SW_CHECK checks whether the 13.2 V switch has been activated long enough and, if it has, it asks whether the system is already in Storage Mode. If it is, the subroutine resets all the delay counters, and, if not already in 13.2 V mode, it will set the control module to this mode. Thereafter, the system will return to the main program. On the other hand, if the switch for Storage Mode has not been activated long enough, the subroutine will execute a control loop (140 in FIG. 5F) for the 13.6 V (Normal Mode) switch which cycles through the same series of steps to check the 13.6 V switch. Finally, if the 13.6 V switch is not engaged, the subroutine enters a control loop to check the 14.4 V (Boost Mode) switch. The control loop implemented to check the 14.4 V switch is similar to the SW_CHECK subroutine (FIGS. 4G–H) described in the first embodiment.

Specifically, if the 14.4 V Boost Mode switch is not engaged, the program executes a series of steps similar to the first embodiment. However, unlike the first embodiment, once this branch of the control loop is complete, the program does not exit the subroutine but asks whether the on/off button is pushed (160 in FIG. 5F) in order to determine whether it should power up the LEDs or not (170 in FIG. 5F). If the on/off switch was activated, the program executes a series of steps to check whether the user has engaged the on/off switch again and thus reactivated the control module. If it detects action, the program "wakes-up" the control module and enters the loop shown in FIG. 5E to determine whether the display should be turned on or off.

If the on/off switch is not activated, the program first invokes a delay to ensure that it is not detecting an "off" condition due to noise. If the switch is truly off, the "off ok" bit is set. Then, the program checks to see if it is in "Storage" Mode (not shown). The Storage Mode operates in a similar manner as in the first embodiment. Note that when the on/off button is activated, the display will only stay on for a predetermined time. Therefore, the Storage Mode needs to be checked when the control module is off.

Notwithstanding the above, the subroutine LNG_TIM_OUT (shown in FIG. 5G) will be invoked after a predetermined time to turn the display off while the system is in the main program loop. For instance, if no manual switches have been engaged for 8 hours, the program will automatically turn the control module display off.

Finally, the second embodiment incorporates a subroutine "CNVTR_ON" (FIG. 5H) to determine whether the power converter is on and, if so, to activate a "power converter on" indicator. The operation of this subroutine is as follows. After executing preliminary initialization steps, the program reads the input voltage (READ_VIN_A3 shown in FIG. 5I) and then asks whether the input voltage is greater than a predetermined threshold voltage (VC_MIN). if it is, the power converter is on and the subroutine instructs the control module to activate LED10 (26' in FIG. 3). If it is not, the subroutine deactivates the indicator, LED10. The program then exits the CNVTR_ON subroutine and returns to the main program.

Overall, in addition to the CNVTR_ON subroutine, a main addition to this second embodiment not incorporated in the initial embodiment are the LED "display" subroutine (discussed in conjunction with FIG. 5A), the LED "test" subroutine (FIG. 5C) and the "display off" subroutine (FIG. 5E), as discussed above.

As indicated briefly at an earlier point, a simplified but useful way of shifting the output level of the power converter to a specified level for a particular task is to merely use a plug-like device insertable directly into the TCMS interface receptacle provided at the power converter, in the same general manner as the aforementioned module connector 20 of FIGS. 2 and 3. Such a plug-like device would desirably incorporate its own internal voltage level-setting circuitry, comparable to the analog circuit 24 for example, by which it would use the battery output voltage as a supply and output a particular regulated or other type of signal derived therefrom directly back to the power converter, instead of supplying the signal to a processor or the like as in the above-described embodiments. In this manner, the power converter output voltage could be directly and immediately changed to an entirely different level (e.g. 9.0 volts) needed for a particular application. Of course, removal of such a control "plug" would allow the power converter to function in its usual manner, and would allow use of the microprocessor-type control module as described above.

Figure 3A:
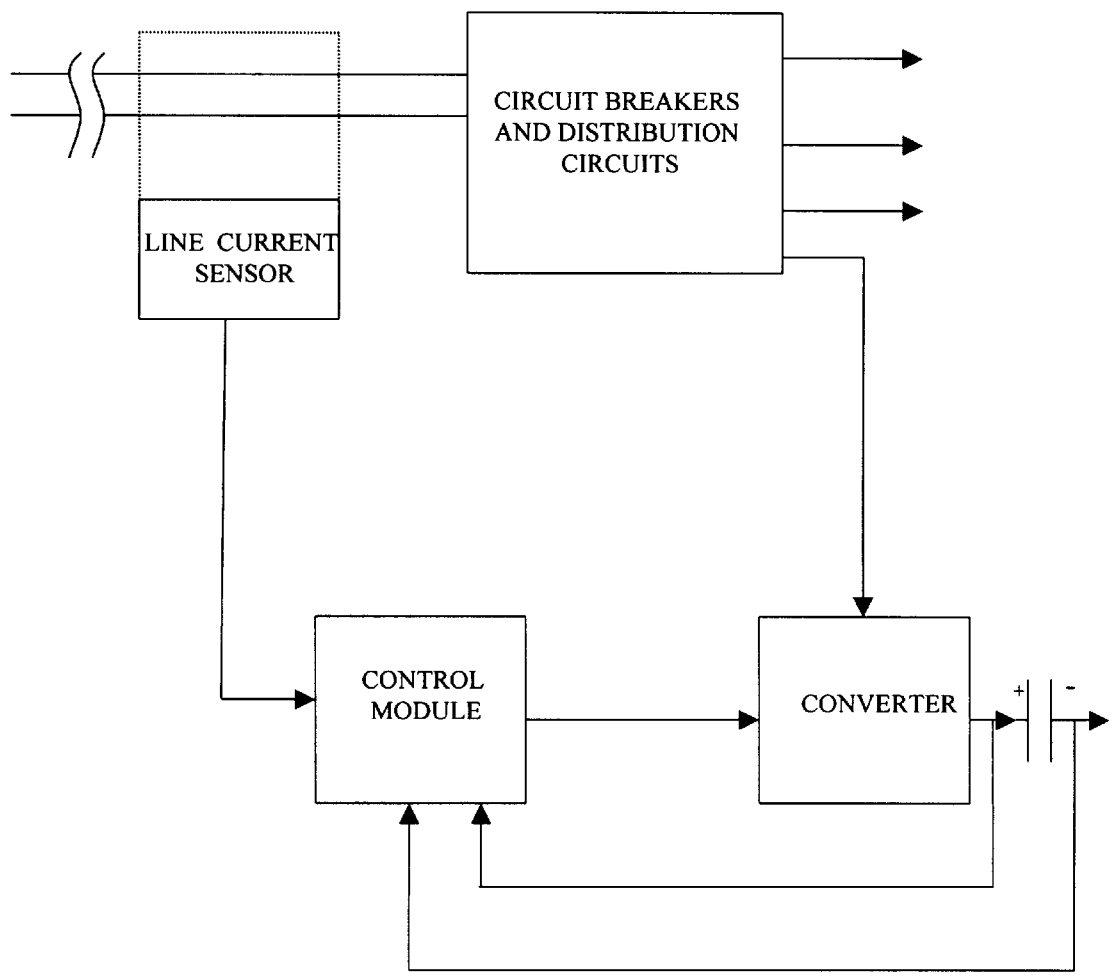
FIG. 3A is a block diagram illustrating the overall circuit configuration of still another embodiment of the invention.

Another feature and aspect of the invention is the automated, programmatic control of power converter output level as a function of an external control parameter such as total line current drawn by a recreational vehicle or other user facility served by the power converter. A basic block diagram of such a control system as shown in FIG. 3A, and the implementation of such a system is well within the ordinary skill of the art practiced pursuant to this basic disclosure, particularly in contemplation of references such as U.S. Pat. No. 4,499,385.

As will be apparent to those skilled in the art, the sensing of such line current may readily be done at or near the location of the power converter, and accomplished indirectly, e.g., by use of an inductive sensor disposed in proximity to the supply line itself. Of course, the detection of supply line current magnitude may also be accomplished by direct connection to the line, e.g., at the circuit-breaker box into which the main supply line connects for further distribution to various user circuits, including the input supply to the power converter. In either event, the determination of instantaneous line current magnitude may be readily accomplished, and a signal (e.g., analog voltage level or digital signal obtained by an A-to-D component) representative of such current magnitude may then be coupled to the control module for initiating corresponding changes in power converter output voltage. For example, upon detection of preselected high or maximum allowable levels of supply line current draw, the control module may, if desired, completely shut-down the power converter to help avoid excessive line current draws.

It will be apparent to those skilled in the art upon due consideration of the foregoing description, along with the circuit schematics and programming flow charts depicted in the drawings, that the present invention provides a number of significant new features and improvements in the structure and function of voltage converters, particularly as utilized in recreational vehicles and the like to operate various appliances and to charge the associated coach batteries, based on an underlying concept of flexible, manual control features for the owner and operator together with overriding intelligent control of a number of associated parameters and operational features, by way of automated, microprocessor-implemented program routines and methodology.

Accordingly, it should be born in mind that the foregoing description of particular preferred embodiments merely sets forth a preferred example and contemplated best modes of implementing the underlying invention, and is not to be deemed a measure of the invention itself, whose scope is to be determined solely by consideration of the ensuing claims construed in accordance with established principles of patent law, including the Doctrine of Equivalents, and the particular terminology used throughout the description of preferred embodiments should be considered as representative rather than specific or limiting. For example, terms such as microprocessor or microcontroller as particularly disclosed in accordance with the preferred embodiment include general purpose processors or any other essentially normal analogous device, including hardwired, fixed-program controllers or circuitry, etc. In addition, the term "charge state" as used in the claims or elsewhere also means "system voltage," i.e., battery output level summed with power converter output, and terms such as "Boost," "Normal," "Storage," etc., have a broader meaning than the specific examples given. Further, it should be noted that the manual switch function disclosed can if desired be used by itself in a simple, non-processor version of the invention.

The claimed invention is:

1. A control module for controlling a power converter output voltage, the power converter output voltage supplying a charging current to a rechargeable battery responsive to the control module, the control module also controlling the power converter output voltage to provide a desulfation mode when the rechargeable battery is supplying an insubstantial load current to a load, the control module comprising:
a microcontroller;
a memory coupled to the microcontroller for storing data and instructions; and
power converter code for causing the microcontroller to perform the steps of:
determining a battery output voltage of the rechargeable battery; and
sending a control signal to the power converter which adjusts the power converter output voltage responsive to the battery output voltage, wherein when the battery output voltage remains approximately constant for a first period the control module provides a storage control signal to the power converter which causes the power converter output voltage to be set to a storage voltage and during each consecutive second period that the power converter output voltage is set to the storage voltage the control module provides a boost control signal to the power converter which causes the power converter output voltage to be set to a boost voltage for a third period before returning to the storage voltage such that desulfation occurs within the rechargeable battery when the rechargeable battery is supplying an insubstantial load current, the boost voltage being greater than the storage voltage and the second period being greater than the third period.

2. The control module of claim 1, wherein the first period is approximately 24 hours and the storage voltage is approximately 13.2 volts.

3. The control module of claim 2, wherein the boost voltage is approximately 14.4 volts, the second period is approximately 21 hours and the third period is approximately 15 minutes.

4. The control module of claim 1, wherein the control module provides a visual indication to a user when the power converter output voltage is set to the storage voltage.

5. The control module of claim 1, wherein the control module causes the power converter output voltage to change from the storage voltage to the boost voltage when the battery output voltage goes below about 12.8 volts.

6. The control module of claim 1, wherein the control module provides a switch which allows a user to manually set the power converter output voltage to the storage voltage.

7. A power converter for supplying charging current to a rechargeable battery, comprising:
an input for receiving an AC power source;
a converter circuit coupled to the input and converting the AC power source to a variable DC power source, the converter circuit further providing a power converter output voltage responsive to a control signal;
an output coupled to the converter circuit, the output providing the power converter output voltage to the rechargeable battery; and
a control module providing the control signal to the converter circuit, the control module comprising:
a microcontroller;
a memory coupled to the microcontroller for storing data and instructions; and
power converter code for causing the microcontroller to perform the steps of:
determining a battery output voltage of the rechargeable battery; and
sending a control signal to the converter circuit which adjusts the power converter output voltage responsive to the battery output voltage, wherein when the battery output voltage remains approximately constant for a first period the control module provides a storage control signal to the converter circuit which causes the power converter output voltage to be set to a storage voltage and during each consecutive second period that the power converter output voltage is set to the storage voltage the control module provides a boost control signal to the converter circuit which causes the power converter output voltage to be set to a boost voltage for a third period before returning to the storage voltage such that desulfation occurs within the rechargeable battery when the rechargeable battery is supplying an insubstantial load current, the boost voltage being greater than the storage voltage and the second period being greater than the third period.

8. The power converter of claim 7, wherein the first period is approximately 24 hours and the storage voltage is approximately 13.2 volts.

9. The power converter of claim 8, wherein the boost voltage is approximately 14.4 volts, the second period is approximately 21 hours and the third period is approximately 15 minutes.

10. The power converter of claim 7, wherein the control module provides a visual indication to a user when the power converter output voltage is set to the storage voltage.

11. The power converter of claim 7, wherein the control module causes the power converter output voltage to change from the storage voltage to the boost voltage when the battery output voltage goes below about 12.8 volts.

12. The power converter of claim 7, wherein the control module provides a switch which allows a user to manually set the power converter output voltage to the storage voltage.

13. A method for preventing sulfation in a rechargeable battery which is coupled to a power converter, the power converter providing a power converter output voltage to the rechargeable battery so as to substantially maintain the rechargeable battery in a fully charged state when the rechargeable battery is providing an insubstantial load current, the method comprising the steps of:

(a) setting the power converter output voltage to a storage voltage for a first period;

(b) setting the power converter output voltage to a boost voltage for a second period following the end of the first period, wherein the boost voltage is greater than the storage voltage and the first period is greater than the second period; and (c) repeating steps (a) through (b) while a battery output voltage of the rechargeable battery is not less than 12.8 volts such that desulfation occurs within the rechargeable battery when the rechargeable battery is supplying an insubstantial load current.

14. The method of claim 13, wherein the first period is approximately 21 hours, the second period is approximately 15 minutes, the storage voltage is approximately 13.2 volts and the boost voltage is approximately 14.4 volts.

15. The method of claim 13, further including the step of:

(d) providing a visual indication to a user when the power converter output voltage is set to the storage voltage.

16. The method of claim 13, wherein the power converter output voltage is set to the boost voltage for 1 hour when the battery output voltage is less than about 12.8 volts.

* * * * *

(12) EX PARTE REEXAMINATION CERTIFICATE (10091st)

United States Patent
Phlipot

(10) Number: US 6,184,649 C1
(45) Certificate Issued: Apr. 2, 2014

(54) POWER CONVERTER WITH DESULFATION MODE

(75) Inventor: Thomas H. Phlipot, Jackson, MI (US)

(73) Assignee: Progressive Dynamics, Inc., Marshall, MI (US)

Reexamination Request:
No. 90/012,854, Apr. 30, 2013

Reexamination Certificate for:
Patent No.: 6,184,649
Issued: Feb. 6, 2001
Appl. No.: 09/349,391
Filed: Jul. 9, 1999

Related U.S. Application Data

(63) Continuation-in-part of application No. 08/729,053, filed on Oct. 10, 1996, now Pat. No. 5,982,643.

(51) Int. Cl.
*H02J 7/00* (2006.01)
*H02M 3/24* (2006.01)
*H02M 3/335* (2006.01)
*H02M 3/337* (2006.01)

(52) U.S. Cl.
USPC .............................................. 320/100; 363/25

(58) Field of Classification Search
None
See application file for complete search history.

(56) References Cited

To view the complete listing of prior art documents cited during the proceeding for Reexamination Control Number 90/012,854, please refer to the USPTO's public Patent Application Information Retrieval (PAIR) system under the Display References tab.

*Primary Examiner* — Anjan K. Deb

(57) ABSTRACT

A power converter supplies a charging current to a rechargeable battery responsive to a control module. The control module includes a microcontroller, a memory coupled to the microcontroller and power converter code. The power converter code causes the microcontroller to determine a battery output voltage of the rechargeable battery. The power converter code also causes the microcontroller to provide a control signal, which adjusts the power converter output voltage responsive to the battery output voltage. The control module also provides for a desulfation mode when the power converter is in a storage mode.

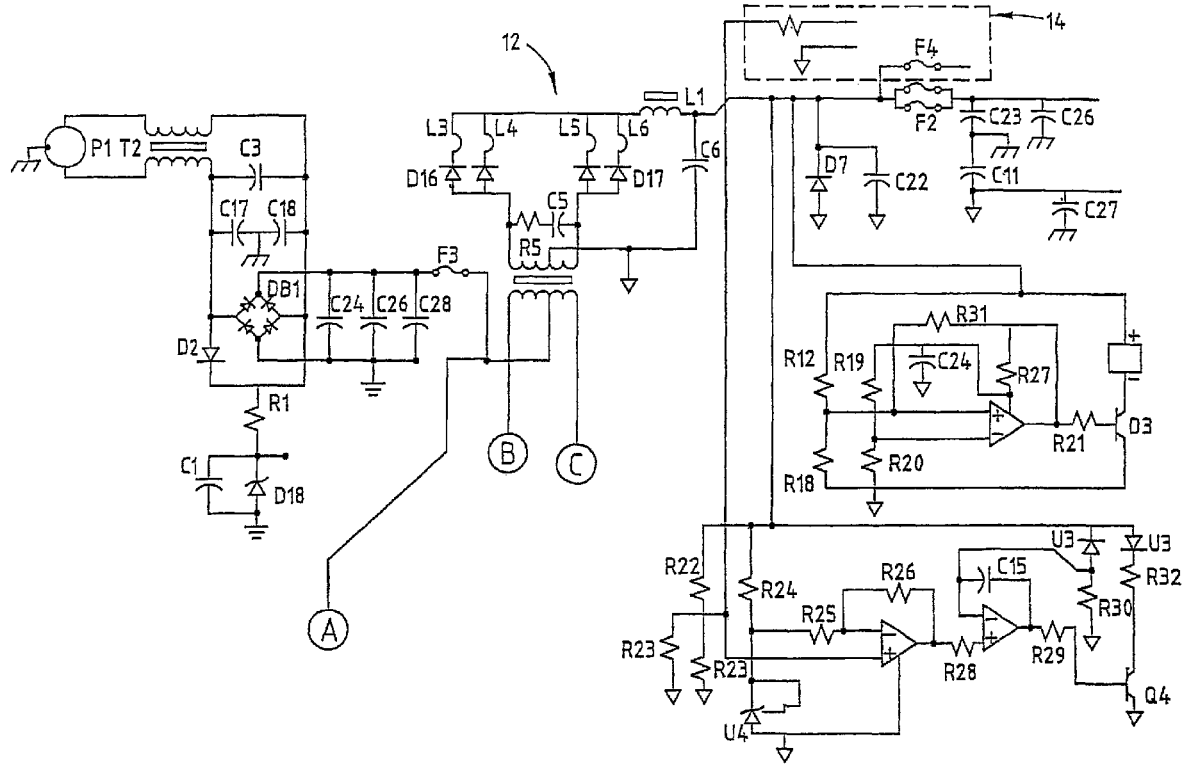

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 4, 7, 10, 13 and 15 is confirmed.

New claims 17-26 are added and determined to be patentable.

Claims 2, 3, 5, 6, 8, 9, 11, 12, 14 and 16 were not reexamined.

*17. The control module of claim 1, wherein said memory is a memory of said microcontroller.*

*18. The control module of claim 1, wherein the second period is a predetermined time period.*

*19. The control module of claim 1, wherein the third period is a predetermined time period.*

*20. The control module of claim 1, wherein the third period ends when the battery voltage reaches a predetermined voltage.*

*21. The control module of claim 1, wherein the third period ends after one of: a predetermined time period and the battery voltage reaches a predetermined voltage, whichever occurs first.*

*22. The power converter of claim 7, wherein said memory is a memory of said microcontroller.*

*23. The power converter of claim 7, wherein the second period is a predetermined time period.*

*24. The power converter of claim 7, wherein the third period is a predetermined time period.*

*25. The power converter of claim 7, wherein the third period ends when the battery voltage reaches a predetermined voltage.*

*26. The power converter of claim 7, wherein the third period ends after one of: a predetermined time period and the battery voltage reaches a predetermined voltage, whichever occurs first.*

* * * * *